(12) United States Patent
Kim et al.

(10) Patent No.: US 11,240,457 B2
(45) Date of Patent: Feb. 1, 2022

(54) METHOD FOR TRANSMITTING IMAGE DATA AND DATA ASSOCIATED WITH CONTROL OF IMAGE CAPTURE, ON BASIS OF SIZE OF IMAGE DATA AND SIZE OF DATA ASSOCIATED WITH CONTROL OF IMAGE CAPTURE, AND ELECTRONIC DEVICE SUPPORTING SAME

(71) Applicant: Samsung Electronics Co., Ltd., Suwon-si (KR)

(72) Inventors: Kwan Ho Kim, Seoul (KR); Dohan Kim, Suwon-si (KR); Jinmin Bang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 16/632,498

(22) PCT Filed: Jun. 4, 2018

(86) PCT No.: PCT/KR2018/006338
§ 371 (c)(1),
(2) Date: Jan. 20, 2020

(87) PCT Pub. No.: WO2019/017586
PCT Pub. Date: Jan. 24, 2019

(65) Prior Publication Data
US 2020/0236317 A1 Jul. 23, 2020

(30) Foreign Application Priority Data

Jul. 20, 2017 (KR) .................... 10-2017-0092210

(51) Int. Cl.
*H04N 5/378* (2011.01)
*H04N 5/369* (2011.01)
(Continued)

(52) U.S. Cl.
CPC ............ *H04N 5/378* (2013.01); *H04N 5/345* (2013.01); *H04N 5/355* (2013.01); *H04N 5/379* (2018.08)

(58) Field of Classification Search
CPC ........ H04N 5/378; H04N 5/379; H04N 5/345; H04N 5/355; H04N 5/232; H04N 5/77;
(Continued)

(56) References Cited

U.S. PATENT DOCUMENTS

2002/0071037 A1  6/2002 Haavisto
2003/0128405 A1  7/2003 Tay
(Continued)

FOREIGN PATENT DOCUMENTS

JP  2012-090357 A  5/2012
KR  10-2006-0083610 A  7/2006
(Continued)

OTHER PUBLICATIONS

ISA/KR, International Search Report and Written Opinion of the International Searching Authority, International Application No. PCT/KR2018/006338, dated Sep. 20, 2018, 16 pages.
(Continued)

*Primary Examiner* — Lin Ye
*Assistant Examiner* — John H Morehead, III

(57) ABSTRACT

An electronic device according to various embodiments of the present invention may comprise: a processor; and an image sensor module electrically connected to the processor, wherein the image sensor module comprises: an image sensor; and a control circuit electrically connected to the image sensor and connected to the processor via an interface, and the control circuit is configured to: receive a signal for capturing an image of an external object; acquire multiple pieces of raw image data of the external object, using the image sensor; generate pixel information data associated
(Continued)

with control of the image capture by the processor, using at least a part of the acquired multiple pieces of raw image data; generate compressed data obtained by compressing at least a part of the multiple pieces of raw image data; transmit the pixel information data to the processor according to a transmission period designated by the processor or the control circuit; and transmit the compressed data to the processor.

18 Claims, 16 Drawing Sheets

(51) Int. Cl.
*H04N 5/345* (2011.01)
*H04N 5/355* (2011.01)

(58) Field of Classification Search
CPC .... H04N 5/9261; H04N 19/134; H04N 19/98; H04N 19/172; H04N 19/15; H04N 19/103; H04N 1/32; H04N 1/41
See application file for complete search history.

(56) References Cited

U.S. PATENT DOCUMENTS

| | | | |
|---|---|---|---|
| 2006/0159358 A1 | 7/2006 | Yi | |
| 2006/0294144 A1* | 12/2006 | Shin | G06F 3/1232 |
| 2008/0088857 A1* | 4/2008 | Zimmer | H04N 1/56 |
| | | | 358/1.6 |
| 2011/0025869 A1 | 2/2011 | Lee | |
| 2012/0044399 A1* | 2/2012 | Hirai | H04N 5/23293 |
| | | | 348/333.01 |
| 2013/0083166 A1* | 4/2013 | Shintani | H04N 13/178 |
| | | | 348/46 |
| 2013/0215295 A1 | 8/2013 | Baek et al. | |
| 2014/0146194 A1 | 5/2014 | Ju et al. | |
| 2015/0077603 A1* | 3/2015 | Matsuzawa | H04N 5/2351 |
| | | | 348/297 |
| 2015/0264246 A1* | 9/2015 | Sartor | H04N 5/77 |
| | | | 348/211.3 |
| 2015/0365675 A1 | 12/2015 | Liang et al. | |
| 2016/0105632 A1* | 4/2016 | Endo | H04N 5/783 |
| | | | 386/225 |
| 2017/0150094 A1* | 5/2017 | Miyamoto | H04N 9/8042 |
| 2017/0163873 A1 | 6/2017 | Kim et al. | |
| 2017/0195574 A1* | 7/2017 | Wong | H04N 5/23258 |
| 2017/0256032 A1* | 9/2017 | Nozawa | H04N 9/8042 |
| 2017/0264858 A1* | 9/2017 | Nozawa | H04N 5/9261 |
| 2018/0184035 A1 | 6/2018 | Kim et al. | |

FOREIGN PATENT DOCUMENTS

| | | |
|---|---|---|
| KR | 10-2011-0013072 A | 2/2011 |
| KR | 10-2013-0094633 A | 8/2013 |
| KR | 10-2017-0067634 A | 6/2017 |
| KR | 10-2018-0074392 A | 7/2018 |

OTHER PUBLICATIONS

Notice of Preliminary Rejection dated Nov. 11, 2021, in connection with Korean Application No. 10-2017-0092210, 15 pages.

* cited by examiner

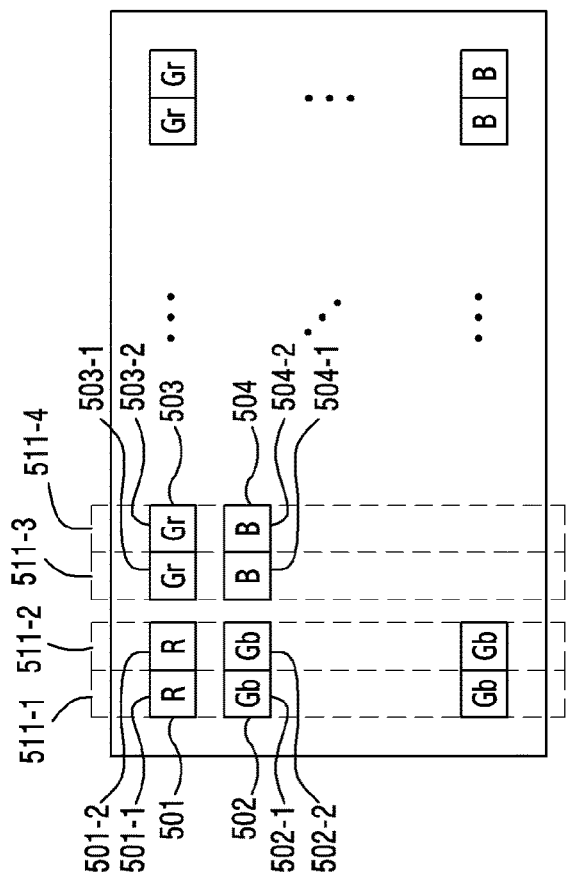
FIG.5A
FIG.5B
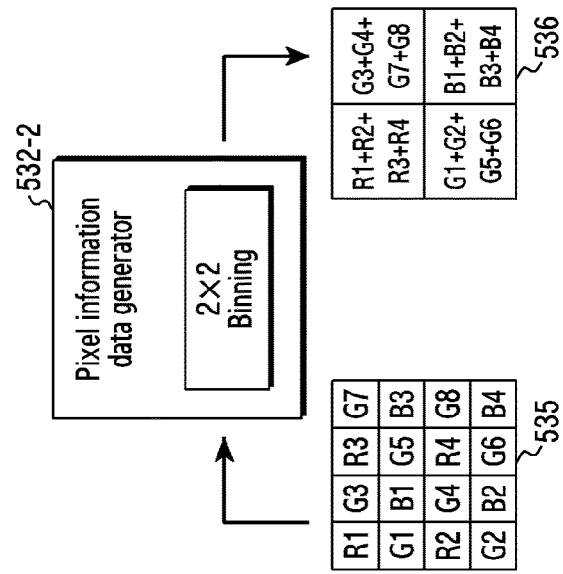
FIG.5C

METHOD FOR TRANSMITTING IMAGE DATA AND DATA ASSOCIATED WITH CONTROL OF IMAGE CAPTURE, ON BASIS OF SIZE OF IMAGE DATA AND SIZE OF DATA ASSOCIATED WITH CONTROL OF IMAGE CAPTURE, AND ELECTRONIC DEVICE SUPPORTING SAME

CROSS-REFERENCE TO RELATED APPLICATIONS

This application is a 371 National Stage of International Application No. PCT/KR2018/006338, filed Jun. 4, 2018, which claims priority to Korean Patent Application No. 10-2017-0092210, filed Jul. 20, 2017, the disclosures of which are herein incorporated by reference in their entirety.

BACKGROUND

1. Field

Various embodiments of the disclosure relate to a method for transmitting image data and data associated with control of image capture on the basis of image data and size of data associated with control of image capture and an electronic device supporting the same.

2. Description of Related Art

With the development of information and communication technology and semiconductor technology, the distribution and use of electronic devices are rapidly increasing. As electronic devices are widely used, the electronic devices support various functions such as a camera function.

With the development of camera function, the speed at which an electronic device acquires an image through an image sensor (or photographing speed) is increasing. In addition, an image sensor module including an image sensor generates image data and image-associated data generated on the basis of image data. Accordingly, in order to improve the quality of an image generated by an electronic device, it is necessary to transmit image data or the like without data loss from the image sensor module to a processor for processing image data.

SUMMARY

In the prior art, when a camera function is executed in a high-speed photographing mode, due to the limitation of the transmission speed of an interface for transmitting data between an image sensor module and a processor, and the speed of generating image-associated data generated in the image sensor on the basis of image data, there is a problem in that it is impossible to transmit the image data and the image-associated data from the image sensor module to the processor in accordance with a speed at which the image sensor module acquires the image.

Various embodiments of the disclosure relate to a method of transmitting image data and image-associated data, in which compressed data and image-associated data is capable of being transmitted from an image sensor module to a processor in an adaptive manner on the basis of the size of the compressed data obtained by compressing the image data and the size of the image-associated data, and relate to an electronic device supporting the method.

The technical subjects pursued in the disclosure may not be limited to the above mentioned technical subjects, and other technical subjects which are not mentioned may be clearly understood, through the following descriptions, by those skilled in the art of the disclosure.

An electronic device according to various embodiments of the disclosure may include a processor and an image sensor module electrically connected to the processor. The image sensor module may include an image sensor and a control circuit electrically connected to the image sensor and connected to the processor via an interface. The control circuit may be configured to: receive a signal for photographing an external object; acquire a plurality of pieces of raw image data for the external object using the image sensor; generate pixel information data associated with control of the photographing of the processor using at least some of the acquired plurality of pieces of acquired raw image data; generate compressed data acquired by compressing at least some of the plurality of pieces of raw image data; transmit the pixel information data to the processor in accordance with a transmission period specified by the processor or the control circuit; and transmit the compressed data to the processor.

A method for transmitting image data and data associated with control of image capture according to various embodiments of the disclosure may include: an operation of receiving a signal for photographing an external object by a control circuit included in a sensor module including an image sensor; an operation of acquiring a plurality of pieces of raw image data for the external object using the image sensor by the control circuit; an operation of generating pixel information data associated with the image capture of a processor electrically connected to the image sensor module and connected to the control circuit via an interface, using at least some of the acquired plurality of pieces of raw image data by the control circuit; an operation of generating compressed data obtained by compressing at least some of the plurality of pieces of raw image data; an operation of transmitting the pixel information data to the processor according to a transmission period specified by the processor or the control circuit; and an operation of transmitting the compressed data to the processor.

With a method of transmitting image data and image-associated data according to various embodiments of the disclosure and an electronic device supporting the same, it is possible to transmit compressed data and the image-associated data from the image sensor module in an adaptive manner on the basis of the size of compressed data obtained by compressing the image data and the size of the image-associated data.

BRIEF DESCRIPTION OF THE DRAWINGS

FIG. 5A is a diagram illustrating an image sensor according to an embodiment of the disclosure;

FIG. 5B is a diagram illustrating a pixel information data generator according to an embodiment of the disclosure;

FIG. 5C is a diagram illustrating a pixel information data generator according to another embodiment of the disclosure;

DETAILED DESCRIPTION

Figure 1:
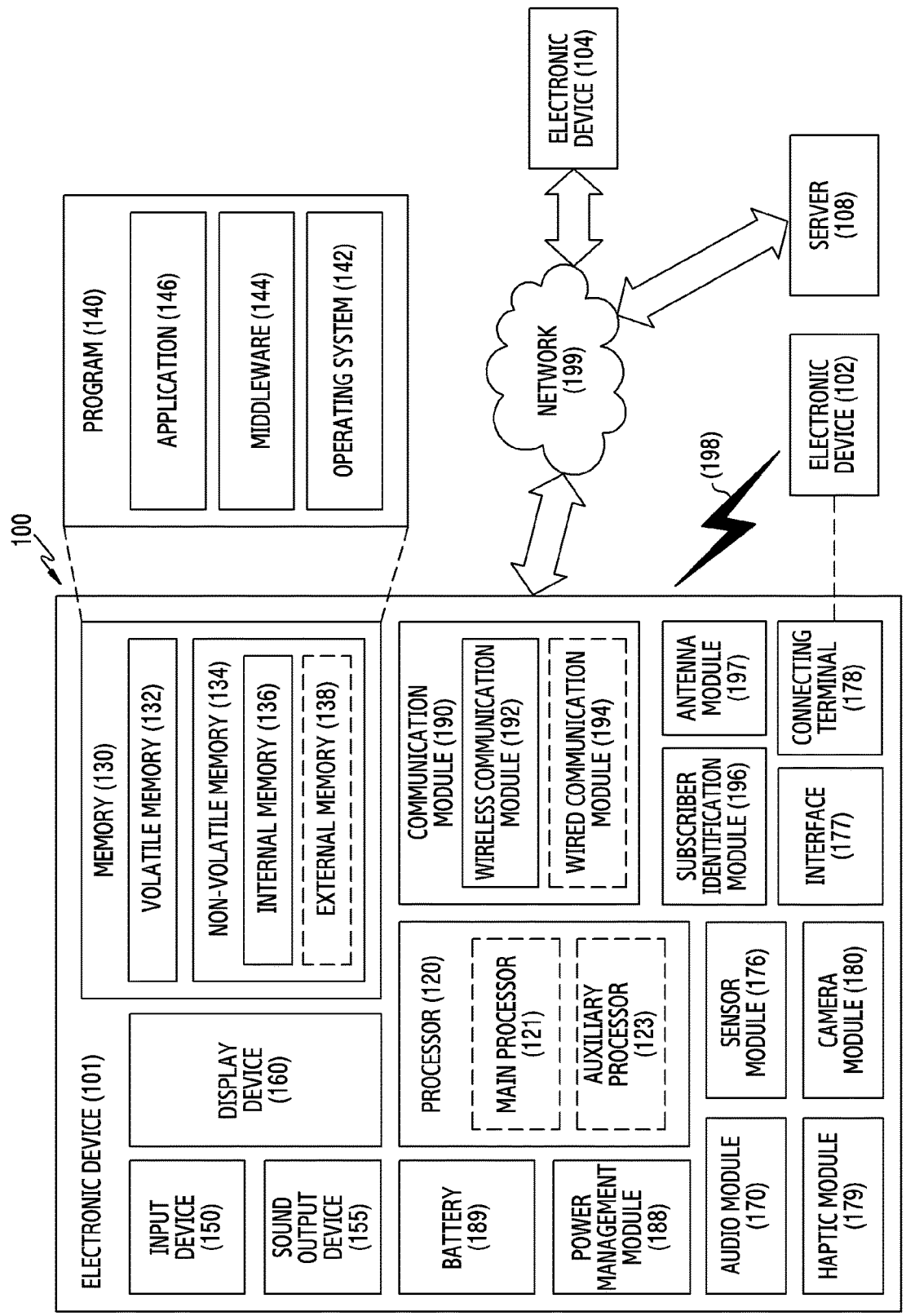
FIG. 1 is a block diagram of an electronic device for transmitting image data in a network environment and data associated with control of image capture, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
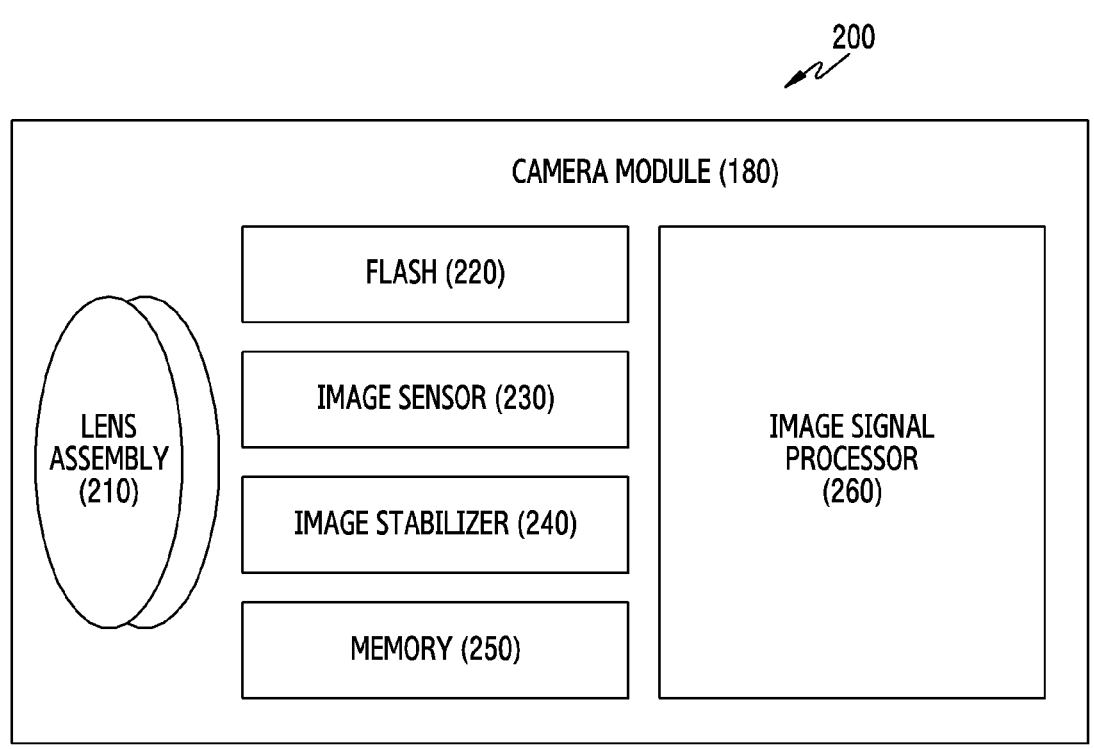
FIG. 2A is a block diagram of a camera module for transmitting image data and data associated with control of image capture, according to various embodiments.

FIG. 2A is a block diagram 200 illustrating the camera module 180 according to various embodiments. Referring to FIG. 2A, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may be, for example, a dual camera, a 360-degree camera, or a spherical camera. the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented as, for example, a charged coupled device (CCD) sensor or a complementary metal oxide semiconductor (CMOS) sensor.

The image stabilizer 240 may move or control (e.g., adjust the read-out timing) the image sensor 230 or at least one lens included in the lens assembly 210 in a particular direction of the image sensor 230 in response to the movement of the camera module 180 or the electronic device 101 including the camera module 180 for compensating for at least part of a negative effect (e.g., image blurring) by the movement on an image being captured. According to an embodiment, the image stabilizer 240 may be implemented, for example, as an optical image stabilizer, and may sense the movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening)) with respect to an image obtained via the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, images processed by the image signal processor 260 may be displayed, by the processor 120, via the display device 160 as it is or after being further processed.

According to an embodiment, the electronic device 101 may include two or more camera modules 180 having different attributes or functions. In such a case, at least one camera module may be, for example, a wide-angle camera or a front camera and at least another camera module may be a telephoto camera or a rear camera.

Figure 2B:
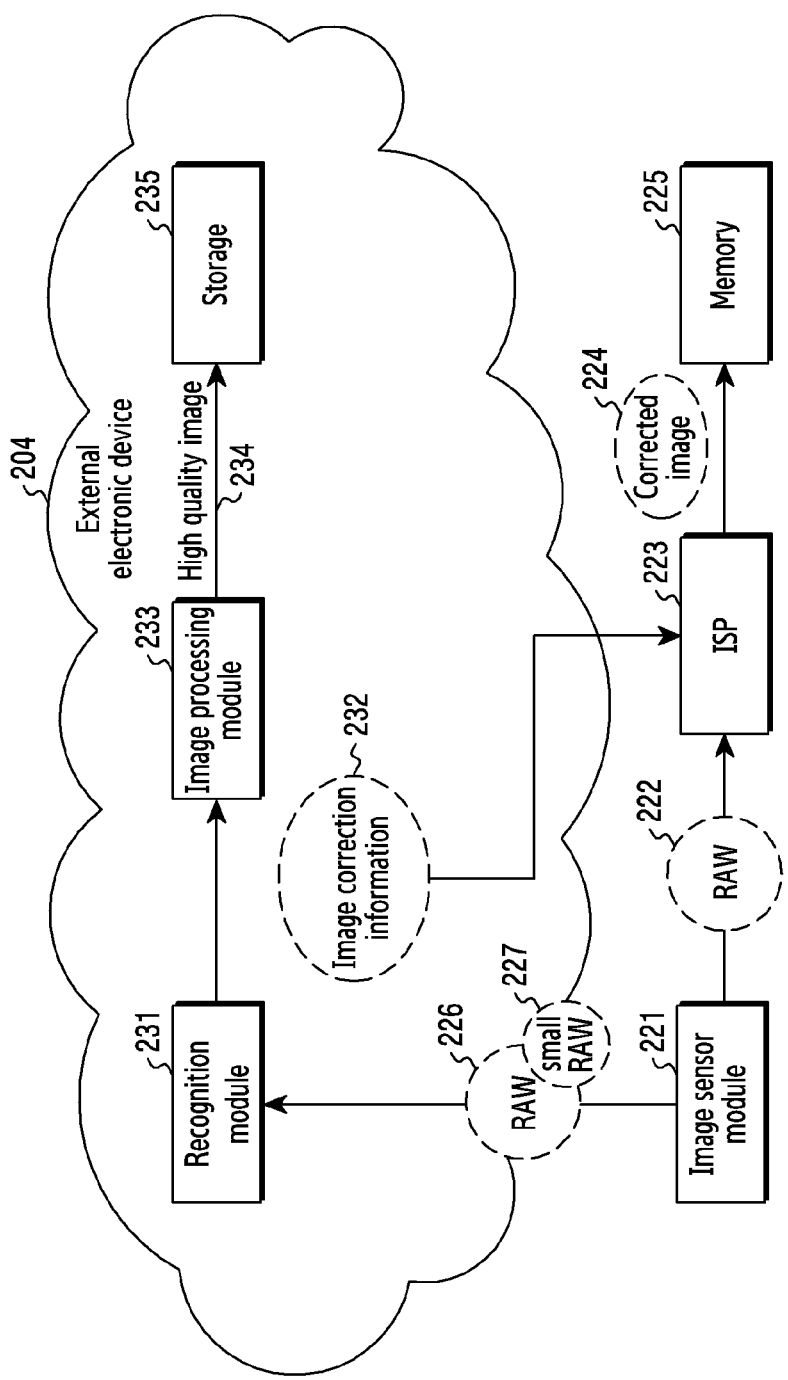
FIG. 2B is a conceptual diagram for explaining operations of an electronic device and an external electronic device for transmitting image data and data associated with an image and image capture, according to various embodiments of the disclosure.

FIG. 2B is a conceptual diagram for explaining an operation of an electronic device for transmitting image data and data associated with control of an image and image capture, according to various embodiments of the disclosure and an operation of an external electronic device.

An electronic device 101 may include an image sensor module 221 (e.g., the image sensor 230 or the image sensor module 310), an ISP 223 (e.g., the processor 120 or the image signal processor 260), and memory 225 (e.g., the memory 130). The external electronic device 204 (e.g., the external electronic device 104) may include a recognition module 231, an image processing module 233, and a storage 235. The recognition module 231 may be a logic module, or may be implemented as a processor of an external electronic device 204. The image processing module 233 may also be implemented as a processor of the external electronic device 204, and for example, the processor of the external electronic device 204 may perform both recognition and image processing. Although not illustrated, the electronic device 101 may include a communication module (e.g., the interface 177 or the communication module 190) capable of transmitting and receiving data with the external electronic device 204. The external electronic device 204 may include a communication module capable of transmitting and receiving data with the electronic device 101.

The image sensor module 221 (e.g., the control circuit 330) may acquire an image of an external object and may generate a raw image 226 corresponding thereto. The image sensor module 221 may deliver the raw image 226 to the ISP 223. In various embodiments of the disclosure, the image sensor module 221 may generate a small raw image 227 and may transmit the same to the external electronics via a communication module (e.g., the interface 177 or the communication module 190). In another embodiment, a processor (e.g., the processor 120) of the electronic device 101 other than the image sensor module 221 may generate the small raw image 227, and may transmit the small raw image 227 to the external electronic device 204 via the communication module. The image sensor module 221 may compress at least a part of the raw image 226 in order to process or transmit the same to the outside (e.g., the processor (e.g., the image processing module 233) or the external electronic device 204). The image sensor module 221 may transmit the compressed raw image 226 to the ISP 223 or the external electronic device 204 (e.g., the image processing module 233). In another embodiment, the ISP 223 (e.g., the image signal processor 260) may transmit, to the external device 204, the raw image or the small raw image received from the image sensor module 221. The image sensor module 221 may compress a part of the raw image 226 for processing and may temporarily store the same in the memory (e.g., the memory 250) inside the image sensor module 221. The recognition module 231 of the external electronic device 204 may acquire the small raw image 227 via the communication module, and may segment at least one image area from the small raw image 227. The recognition module 221 may recognize each of one or more image areas divided by the segmentation result. Image correction information 232, including at least one piece of information associated with a plurality of image areas generated from the recognition module 221, for example, coordinate information of the image area or a recognition result, may be generated. The image correction information 232 may be transmitted to the electronic device 101. The ISP 223 may correct the raw image 226 using the image correction information 232, and thus a corrected image 224 may be generated. The corrected image 224 may have, for example, a YUV format. The corrected image 224 may be stored in memory 425. Alternatively, the corrected image 224 may be compressed according to, for example, the JPEG method, and the compressed image may be stored in the memory 225.

In various embodiments of the disclosure, the raw image 226 provided from the image sensor module 221 may be transmitted to the external electronic device 204 separately from the small raw image 227. Since the raw image 226 has a larger capacity than the small raw image 227, the small raw image 227 may be first transmitted to the external electronic device 204, and then the raw image 226 may be transmitted to the external electronic device 204. For example, the raw image 226 may be transmitted to the external electronic device 204 while the ISP 223 performs the correction on the raw image 226. The raw image 226 may be uploaded to the external electronic device 204 in the state of being generated by the image sensor module 221, or a preprocessed image on which lens distortion compensation or noise removal has been performed may be uploaded. The above-described preprocessing may be performed in the external electronic device 204. The external electronic device 204 may perform demosaic processing, image format modification, or preprocessing to increase an image recognition rate. The image processing module 233 of the external electronic device 204 may correct the received raw image 226. The external electronic device 204 may correct the raw image 226 using the previously generated image correction information 232, or may correct the raw image 226 using expanded image correction information. The raw image 226 may have a higher resolution than the small raw image 227, and thus the image processing module 233 of the external electronic device 204 may obtain more detailed expanded image correction information from a high-resolution image. The image processing module 233 may generate the expanded image correction information using both the previously generated image correction information and the raw image 226. The image processing module 233 may acquire a high quality image 234 by correcting the raw image 226 using the expanded image correction information. The high quality image 234 may be stored in the storage 235 of the external electronic device 204 and may be downloaded to the electronic device 101.

According to various embodiments, the small raw image 227 means a raw image having a size smaller than the data size of the raw image 226, and is not limited to an image generated by a specific format or a specific method. For example, the small raw image 227 may be generated by reducing the capacity of the raw image 226 and may be referred to as a lightweight image. For example, the electronic device 101 may generate the small raw image 227 from the raw image 226 using various down-scale methods or down-sampling methods. By performing at least one of, for example, adjustment of the resolution of the raw image 226, selection of at least some of a plurality of frequency bands, or selection of at least one of a plurality of bit plane levels, the electronic device 101 may generate a small raw image 227 having a smaller size than the size of the data of the raw image 226. The electronic device 101 may generate the small raw image 227, for example, by extracting a low-frequency band from the raw image 226. For example, by select some bit plane levels among the plurality of bit plane levels of the raw image 226, the electronic device 101 may generate the small raw image 227. The small raw image 227 may be an image including at least a part of information of the raw image 226 but having a smaller capacity than the raw image 226. When the small raw image 227 is transmitted to the external electronic device 204 instead of the raw image 226, it means that data of a smaller capacity is transmitted. Therefore, it is possible to transmit the image to the external electronic device 204 more quickly.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. According to an embodiment, the electronic devices are not limited to those described above.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit including hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 3:
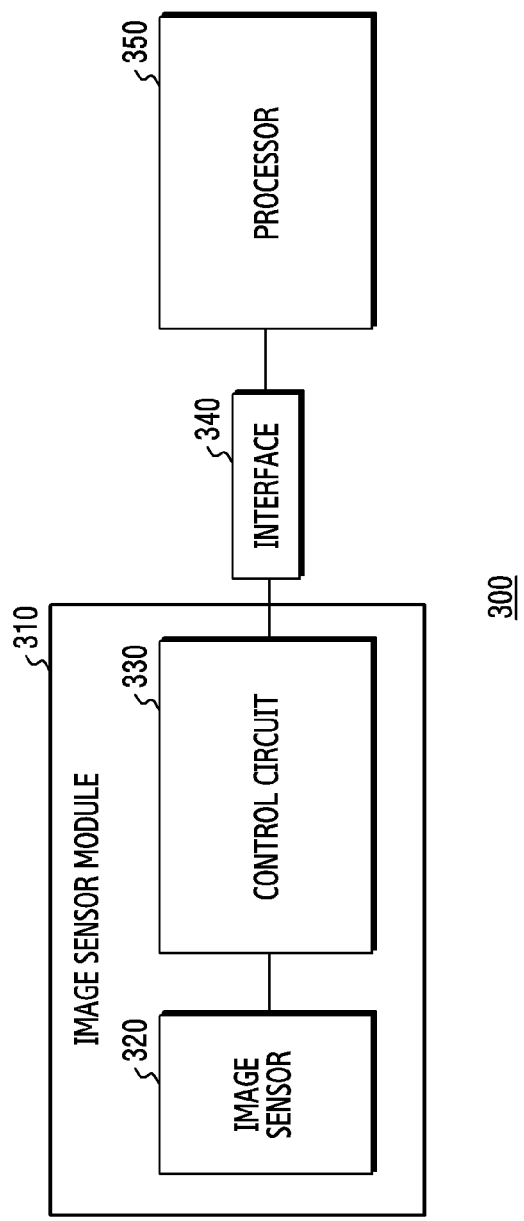
FIG. 3 is a diagram illustrating the overall configuration of a device for transmitting image data and data associated with control of image capture according to various embodiments of the disclosure.

FIG. 3 is a diagram illustrating the overall configuration of a device configured to transmit image data and data associated with control of image capture according to various embodiments of the disclosure.

Referring to FIG. 3, a device 300 configured to transmit image data and image-associated data may include an image sensor module 310, an interface 340, and a processor 350 (e.g., the processor 120 or the image signal processor 260), and the like.

In an embodiment, the device 300 configured to transmit image data and data associated with control of image capture may be included in the camera module 180 in FIG. 2. In another embodiment, some components of the image sensor module 310 and the processor 350 may be included in the camera module 180 in FIG. 2, and the remaining components of the processor 350 may be included in the processor 120 in FIG. 1. In still another embodiment, the image sensor module 310 may be included in the camera module 180 in FIG. 2, and the processor 350 may be included in the processor 120 in FIG. 1.

In an embodiment, the image sensor 320 (e.g., the image sensor 230) may include a plurality of pixels (or a pixel array). At least one photo diode disposed (or arranged) in each of the plurality of pixels may convert light collected in the photo diode into an electrical signal (e.g., an analog electrical signal).

In an embodiment, the image sensor 320 may be a dual pixel image sensor in which two photodiodes (or photosensitive diodes) are disposed in one pixel. In the following description, it is assumed that the image sensor 320 is implemented as a dual pixel image sensor. However, in various embodiments, it will be apparent to those skilled in the art that the technical idea of the disclosure is equally applicable even when the image sensor 320 is implemented as an image sensor in a type in which one photodiode is disposed in one pixel.

In an embodiment, the image sensor module 310 (e.g., the control circuit 330) and the processor 350 may be connected via the interface 340. For example, the image sensor module 310 may deliver image data to the processor 350 using a D-PHY and/or a C-PHY interface defined by a mobile industry processor interface (MIPI).

In an embodiment, the control circuit 330 may receive a signal for photographing an external object. For example, the control circuit 330 may receive a signal (or input) for providing a live view (or preview) for an external object via a display (e.g., the display device 160). In another example, the control circuit 330 may receive a signal for executing a half shutter function for adjusting a focal length (or focusing) with respect to an external object while providing the live view. In still another example, the control circuit 330 may receive a signal for capturing a still image or a moving image. However, the signal for photographing an external object is not limited to the above-mentioned examples.

In an embodiment, the control circuit 330 may obtain a plurality of pieces of image data for an external object using the image sensor 320. For example, the control circuit 330 may generate a plurality of pieces of image data for an external object by converting analog electrical signals delivered from the plurality of pixels into digital electrical signals. Hereinafter, image data generated in the form of a digital electrical signal by the control circuit 330 will be referred to as raw image data, or raw data.

In an embodiment, when the image sensor 320 is implemented as a dual pixel image sensor, the control circuit 330 may generate raw image data by coupling (combining or merging): image data, which is generated on the basis of electrical signals generated from photodiodes composed of photodiodes, each of which is disposed on one side (or column or row) of each pixel in at least some of a plurality of pixels, and corresponds to the one side (hereinafter, referred to as "left image data"); and image data, which is generated on the basis of electrical signals generated from photodiodes composed of photodiodes, each of which is disposed on the other side (e.g., right side) of each pixel, and corresponds to the other side (hereinafter, referred to as "right image data"). In an embodiment, the control circuit 330 may store the generated raw image data in memory (not illustrated) (e.g., the memory 130 and the memory 250).

In an embodiment, the control circuit 330 may generate pixel information data as data associated with control of image capture. In an embodiment, the pixel information data may be data generated at least partially on the basis of image data (e.g., at least one of raw image data, left image data, or right image data) and associated with photographing control of the processor 350. In an embodiment, when the image sensor 320 is implemented as a dual pixel image sensor including a pixel in which two or more photosensitive diodes (or photo diodes) are disposed, the control circuit 330 may generate data for phase autofocus as pixel information data at least partially on the basis of a phase difference caused by the arrangement of two or more photosensitive diodes identified in at least some of a plurality of pieces of raw image data.

In an embodiment, the pixel information data may include at least one of data for auto white balance, data for motion of an external object (e.g., data for motion detection or data for motion prediction), or data for digital image stabilization (DIS), in addition to the data for phase autofocus. However, the pixel information data is not limited to the above-mentioned examples. In an embodiment, the control circuit 330 may store the generated pixel information data in memory (not illustrated) (e.g., the memory 130 and the memory 250).

In an embodiment, the control circuit 330 may compress raw image data and optionally pixel information data. For example, the control circuit 330 may compress the raw image data in order to reduce the size of the raw image data. The control circuit 330 may compress the raw image data, thereby generating data in which the raw image data is compressed (hereinafter, referred to as "compressed data"). In an embodiment, the control circuit 330 may or may not compress pixel information data. For example, the control circuit 330 may identify the size of the pixel information data. When the size of the pixel information data is less than a predetermined threshold value, the control circuit 330 may not compress the pixel information data. When the size of the pixel information data is equal to or greater than a specified threshold value, the control circuit 330 may compress the pixel information data. However, as will be described in detail later, even if the control circuit 330 compresses the pixel information data, uncompressed pixel information data or compressed pixel information data may be transmitted to the processor 350 at least partially on the basis of the compressed ratio of the compressed pixel information data.

In an embodiment, the control circuit 330 may transmit the pixel information data to the processor 350 according to a transmission period specified by the processor 350 or the control circuit 330.

In an embodiment, the period for transmitting the pixel information data to the processor 350 may be determined independently of the period for transmitting the compressed data to the processor 350. For example, the period for transmitting the pixel information data to the processor 350 may be specified (determined) depending on a period for processing the pixel information data by the processor (or a period set for processing or a specification for processing the pixel information data). In another example, a period for transmitting the pixel information data to the processor 350 may be specified by the control circuit 330.

In an embodiment, the specified period for transmitting pixel information data to the processor 350 may vary. For example, in the frame interleaving method to be described later, when it is impossible for the control circuit 330 or the processor 350 to transmit the pixel information data split by the specified transmission period, the control circuit 330 or the processor 350 may change the transmission period for transmitting the pixel information data. Detailed operations related to the change of the period for transmitting the pixel information data will be described later.

In an embodiment, the control circuit 330 may determine a method of combining (or transmitting) the pixel information data at least partially on the basis of the size of the compressed data and the size of the pixel information data.

For example, the control circuit 330 may identify the size of the compressed data. In an embodiment, the size of the pixel information data may be the size of compressed or uncompressed pixel information data. In an embodiment, the control circuit 330 may determine whether or not the sum of the size of the compressed data and the size of the pixel information data exceeds a capacity (or a maximum transmission amount) (hereinafter, referred to as "unit frame size") transmittable for the data transmission period (hereinafter, referred to as "unit frame period") (or for one period for transmitting data) of the interface 340 between the image sensor module 310 and the processor 350. Hereinafter, a data frame transmitted by the interface 340 for the unit frame period (or a data transmission unit of the interface 340) will be referred to as a "unit frame". In an embodiment, the control circuit 330 may determine whether or not the sum of the size of data obtained by compressing a raw image data corresponding to one image frame and the size of pixel information data generated at least partially on the basis of one image frame (or pixel image data for one image frame) exceeds the unit frame size. In an embodiment, the control circuit 330 may determine whether or not the compressed data (or data obtained by compressing the raw image data corresponding to one image frame) and the pixel information (or the pixel information data for one image frame) and transmittable simultaneously (or at once) within the unit frame for the unit frame period for the interface 340 between the image sensor module 310 and the processor 350.

In an embodiment, the unit frame period (or transmission speed) of the interface 340 between the image sensor module 310 and the processor 350 may be the same as the period for acquiring an image frame for an external object in the image sensor module 310. However, the disclosure is not limited thereto.

In an embodiment, when the control circuit 330 determines that the sum of the size of the compressed data and the size of the pixel information data exceeds the unit frame size, the control circuit 330 may control the interface 340 to transmit split data, which is obtained by splitting the pixel information data for one image frame on the basis of a raw image data acquisition speed and a speed for processing the pixel information data (or the speed set to process the pixel information data), together with (in conjunction with or combination with) the compressed data corresponding to one image frame. Hereinafter, the method of splitting the pixel information data for one image frame and transmitting the split pixel information data together with compressed data for one image frame will be referred to as a "frame interleaving" method. In the case of the frame interleaving method, for example, when the raw image data acquisition speed is 960 fps (frames per second), the speed for processing pixel information data is 30 fps, and the control circuit 330 determines that the sum of the size of the compressed data and the size of the pixel information data exceeds the unit frame size, the control circuit 330 may control the interface 340 to transmit compressed data for one image frame and split data having a size corresponding to 1/32 of the pixel information data size for one image frame together within the unit frame. In this example, since the control circuit 330 transmits split data having a size corresponding to 1/32 of the pixel information data size for one image frame during 32 periods of data transmission of the interface 340, the period for transmitting pixel information data for one frame may be a time obtained by multiplying the unit frame period by 32 (or 32 times the unit frame period). In an embodiment, the period for transmitting each split data may be the same as the period for acquiring the image frame in the image sensor module 310 and the unit frame period. However, the disclosure is not limited thereto. In an embodiment, the control circuit 330 may split the pixel information data for one image frame into split data, the number of pieces of which substantially corresponds to a value obtained by dividing the speed of transmitting a raw image by the image sensor 320 by the speed for processing the pixel information data. For example, as in the case in which the raw image data acquisition speed is 950 fps (frames per second) and the speed for processing the pixel information data is 30 fps, when the value obtained by dividing the raw image data acquisition speed by the speed for processing the pixel information data (e.g., 950/32) is not an integer, the control circuit 330 may determine the value obtained by adding "1" to the integer value (e.g., 31) in the value obtained by the division as the number of split data (e.g., 32). However, the disclosure is not limited thereto.

In an embodiment, when the control circuit 330 determines that the sum of the size of the compressed data and the size of the pixel information data is equal to or smaller than the unit frame size, the control circuit 330 may control interface 340 to combine (or interleave) at least a part of pixel information data for one image frame between specified intervals of data lines within compressed data for one image frame and to transmit the combined data to processor 350 such that compressed data and pixel information data for one image frame in a unit frame can be simultaneously transmitted within the unit frame. In an embodiment, the size of at least a part of the pixel information data combined between specified intervals of data lines within the compressed data for one image frame may be the size obtained by multiplying the size of the pixel information data for the one image frame by the ratio of the specified data line intervals relative to the total number of lines of compressed data for the one image frame. For example, when the compressed data for one frame is composed of 20 data lines and at least a part of pixel information data is combined every four data lines, at least a part of pixel information data having a size obtained by multiplying the size of the pixel information data for the one image frame by 1/5 (=4/20) may be combined every four data lines, for example, between the 4th and 5th data lines, between the 8th and 9th data lines, between the 12th and 13th data lines, between the 16th and 17th data lines, and after the 20th data line. However, the disclosure is not limited thereto. For example, the control circuit 330 may control the interface 340 to transmit, to the processor 350, data, in which the entire pixel information data for one image frame is combined after all of the data lines (e.g., 20 data lines) of compressed data for one frame, within one unit frame of the interface 340.

Hereinafter, a method of transmitting data by combining at least a part of pixel information data for each specified data line interval of compressed data for one image frame will be referred to as a "line interleaving" method. In the case of the line interleaving method, a period for transmitting compressed data and pixel information data for one image frame may be the same as a period for processing the pixel information data. For example, in the line interleaving method, when the pixel information data processing speed is 30 fps, the control circuit 330 may transmit, to the processor 350, data in which the compressed data and the pixel information data for one image frame are combined within a unit frame in a period of 1/30 sec.

In an embodiment, even if the sum of the size of the compressed data and the size of the pixel information data is equal to or smaller than the unit frame size (e.g., both the frame interleaving method and the line interleaving method are possible), the control circuit 330 may combine the compressed data and the pixel information data by the frame interleaving method rather than by the line interleaving method. For example, the frame interleaving method may be advantageous in terms of stability of data transmission (e.g., error rate or loss rate). Thus, when both the frame interleaving method and the line interleaving method are possible, the control circuit 330 may transmit, to the processor 350, data in which the compressed data and the pixel information data are combined using the frame interleaving method.

In an embodiment, the control circuit 330 may further consider the attribute of the pixel information data in order to determine the method of transmitting the pixel information data (or combining the pixel information data with the compressed data) (e.g., the frame interleaving method or the line interleaving method).

For example, when the sum of the size of the compressed data and the size of the pixel information data is equal to or smaller than the unit frame size, the control circuit 330 may combine the compressed data and the pixel information data using the frame interleaving method or the line interleaving method and may transmit the combined data to the processor 350. In an embodiment, when both the frame interleaving method and the line interleaving method are possible, for example, for pixel information data that requires fast processing (or low latency), such as data for autofocus (or autofocus data), in view of the attributes of the pixel information data, the control circuit 330 may combine the compressed data and the data for autofocus using the line interleaving method and may transmit the combined data to the processor 350. In another example, for pixel information data that does not require fast processing, such as data for auto white balance, the control circuit 330 may combine the compressed data and the data for autofocus and may transmit the combined data to the processor 350 by the frame interleaving method.

In an embodiment, the attributes of the pixel information data may include the time required by the processor 350 to process the pixel information data, in addition to the type of pixel information data (e.g., data for autofocus, or data for auto white balance). For example, when both the frame interleaving method and the line interleaving method are possible, for the pixel information data that requires a long processing time in the processor 350, the control circuit 330 may combine the compressed data and the pixel information data and may transmit the combined data to the processor 350 by the line interleaving method. In an embodiment, the time required by the processor 350 to receive pixel information data for one image frame may be long in the frame interleaving method of combining compressed data for a plurality of image frames and split pixel information data obtained by splitting the pixel information data for one image frame and transmitting the combined data, compared to the line interleaving method of simultaneously transmitting the compressed data and the pixel information data for one image frame. For example, in the line interleaving method, a first image frame and pixel information data for the first image frame may be simultaneously received by the processor 350. When the raw image data acquisition speed is 960 fps, the pixel information data processing speed is 30 fps, and the frame interleaving method is used, the processor 350 may receive the pixel information data for the first (or one) image frame while raw image data for, for example, 32 image frames is received.

In an embodiment, the control circuit 330 or the processor 350 may change the specified period for transmitting pixel information data to the processor 350. For example, when it is determined that data is to be transmitted by the frame interleaving method, the control circuit 330 may determine the size of the split pixel information data on the basis of a raw image data acquisition speed (or a specified raw image data transmission speed) and a specified pixel information data processing speed. When the sum of the compressed data for one image frame to be combined with the split pixel information data and the size of the split pixel information data exceeds the unit frame size, the control circuit 330 may combine the compressed data and the pixel information data by increasing (or lengthening) the period for transmitting the pixel information data to the processor 350. For example, when the raw image data acquisition speed is 960 fps and the pixel information data transmission speed is 30 fps, the control circuit 330 may determine to combine the split pixel information data having the size corresponding to ⅓₂ of the size of the pixel information data with the compressed data. When the unit frame size is smaller than the size of the compressed data and the size of the split pixel information data, the control circuit 330 may change, for example, the pixel information data transmission speed to 15 fps. When the control circuit 330 determines that the sum of the size of the split pixel information data having the size corresponding to ¹⁄₆₄ of the size of the pixel information data and the size of the compressed data is equal to or smaller than the unit frame size, the control circuit 330 may combine the split pixel information data having the size corresponding to ¹⁄₆₄ of the size of the pixel information data size with the compressed data using the frame interleaving method, and may transmit the combined data to the processor 350. In the above-described example, changing the pixel information data transmission speed to 15 fps is illustrated, but is not limited thereto. For example, the control circuit 330 may change the pixel information data transmission speed (or period) to a transmission speed (or period) that makes the sum of the size of the split pixel information data and the size of the compressed data equal to or smaller than the unit frame size.

In an embodiment, when the sum of the compressed data for one image frame to be combined with the split pixel information data and the size of the split pixel information data is smaller than the unit frame size, the control circuit 330 may maintain the specified period for transmitting pixel information data to the processor 350 without changing. However, the disclosure is not limited thereto.

In an embodiment, the interface 340 may transmit the compressed data and the pixel information data generated by the image sensor module 310 to the processor 350. In an embodiment, the interface 340 may be a mobile industry processor interface (MIPI). However, the disclosure is not limited thereto, and all of the data transmission standards capable of transmitting data between components (or chips) inside the electronic device are applicable.

In an embodiment, the processor 350 may process compressed data and pixel information data transmitted from the image sensor module 310 via the interface 340. For example, the processor 350 may store acquired compressed data and pixel information data and may decompress the compressed data or optionally the pixel information data. In order to process raw image data, the processor 350 may deliver decompressed data to an image signal processor (e.g., the image signal processor 260), and in order to process the pixel information data, the processor 350 may deliver the pixel information data to a pixel information processing unit (not illustrated).

In an embodiment, the processor 350 may determine a data transmission method (e.g., the frame interleaving method or the line interleaving method), or when the data transmission method is determined, the processor 350 may perform an operation of determining a ratio of splitting pixel information data or the like.

Although not illustrated, the processor 350 may control the photographing of an external object (e.g., adjusting focus by moving a lens) at least partially on the basis of the processed pixel information data (e.g., focal length data).

Figure 4:
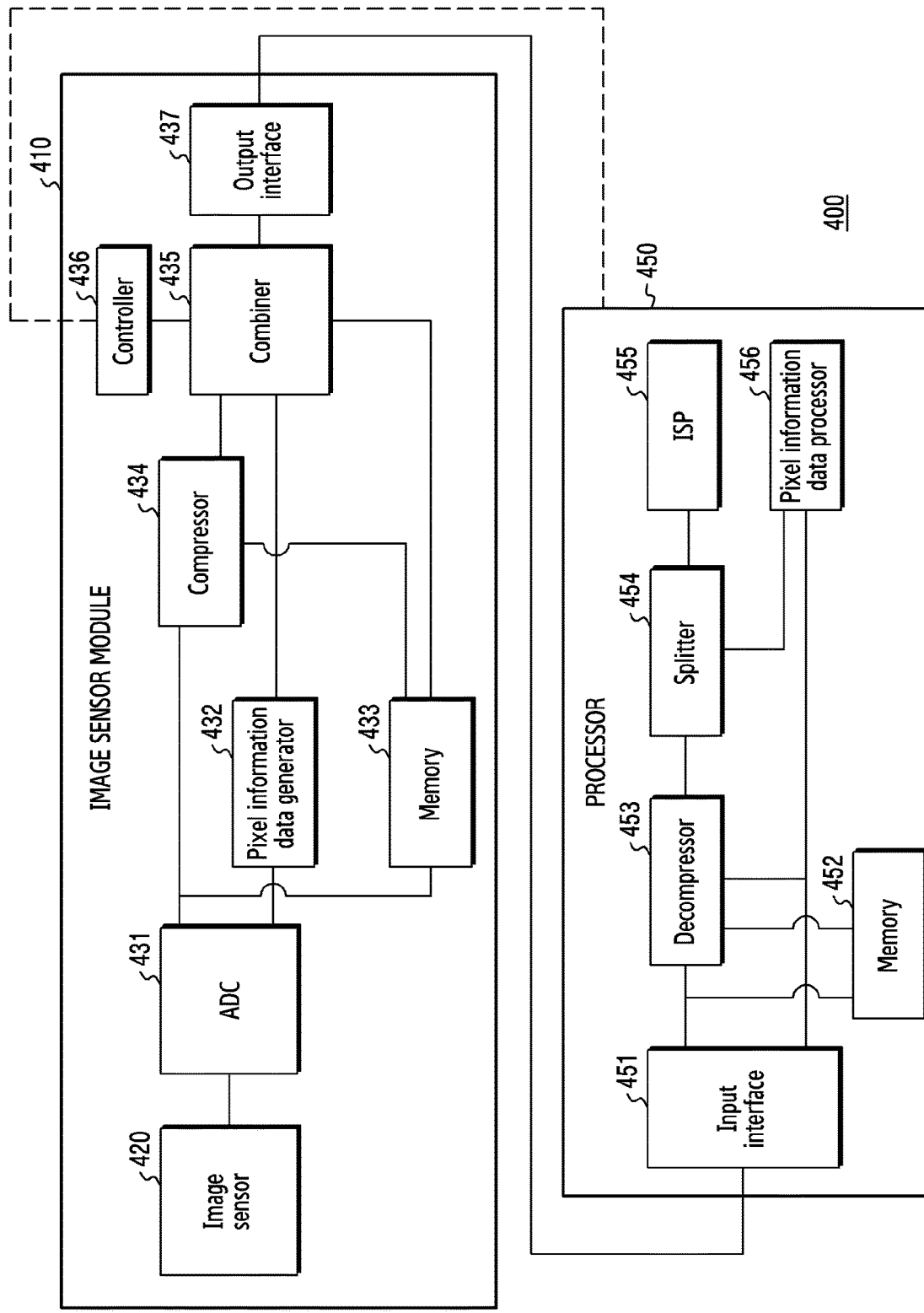
FIG. 4 is a diagram illustrating the details of a device for transmitting image data and data associated with control of image capture according to various embodiments of the disclosure.

FIG. 4 is a diagram illustrating the details of a device 400 configured to transmit image data and data associated with control of image capture according to various embodiments of the disclosure.

When comparing FIG. 4 with FIG. 3, an analog digital converter (ADC) 431, a pixel information data generator 432, memory 433, a compressor 434, a combiner 435, and a controller 436 of FIG. 4 may be included in the control circuit 330 or the image sensor module 310 (e.g., the image sensor module 221) of FIG. 3. However, the memory 433 (e.g., the memory 250) may be included in the image sensor module 410 or in the memory 130 of FIG. 1 as a component independent of the control circuit 330. The memory 452 may be included in the processor 450 (e.g., the processor 120, the image signal processor 260, the ISP 223, or the processor 350) or may be included in the memory 130 of FIG. 1 as a component independent of the processor 450. Hereinafter, descriptions overlapping with those of the device of FIG. 3 will be omitted.

In an embodiment, the image sensor 420 (e.g., the image sensor 320 or the image sensor 230) may be a dual pixel image sensor in which two photodiodes are disposed in one pixel.

FIG. 5A is a diagram illustrating an image sensor 420 according to an embodiment of the disclosure. For example, FIG. 5A may correspond to a diagram illustrating a dual pixel image sensor. Referring to FIG. 5A, each of pixels 501 to 504 may include two photodiodes. The image sensor 420 may include photodiodes 511-1 and 511-3 configured as photodiodes disposed on the left of respective pixels 501 to 504, and photodiodes 511-2 and 511-4 configured as of photodiodes disposed on the right of respective pixels 501 to 504. In an embodiment, the image sensor 420 may deliver signals in which analog electrical signals generated from the left photodiodes 511-1 and 511-3 and analog electrical signals generated from the right photodiodes 511-2 and 511-4 are combined and analog electrical signals generated by the left photo diodes 511-1 and 511-3 to the ADC 431.

In various embodiments, it will be apparent to those skilled in the art that the technical idea of the disclosure is equally applicable not only when the image sensor 420 is implemented as a dual image sensor, but also when the image sensor 420 is implemented as an image sensor in a type in which one photodiode is disposed in one pixel.

In an embodiment, the ADC 431 may convert signals in which analog electrical signals generated from the left photodiodes 511-1 and 511-3 and analog electrical signals generated from the right photodiodes 511-2 and 511-4 into digital electrical signals (or raw image data). In an embodiment, the ADC 431 may convert analog electrical signals generated from the left photodiodes 511-1 and 511-3 into digital electrical signals (or left image data). Although it is described that, in the image sensor 420, analog electrical signals are generated by the left photodiodes 511-1 and 511-3, and the ADC 431 generates left image data, the disclosure is not limited thereto. For example, in the image sensor 420, instead of generating analog electrical signals generated by the left photodiodes 511-1 and 511-3, analog electrical signals may be generated by the right photodiodes 511-2 and 511-4, and the ADC 431 may generate right image data instead of left image data.

In an embodiment, the pixel information data generator 432 may generate pixel information data at least partially on the basis of the raw image data and the left image data received from the ADC 431.

FIG. 5A is a diagram illustrating a pixel information data generator 532-1 according to an embodiment of the disclosure. For example, the pixel information data generator 532-1 of FIG. 5B may correspond to a component for generating data for phase autofocus (or data necessary for a phase autofocus operation).

Referring to FIG. 5B, the pixel information data generator 532-1 may receive raw image data (Bayer (L+R)) and left image data (Bayer (L)) from the ADC 431. In an embodiment, the pixel information data generator 532-1 may generate data for left autofocus (Y data (L)) at least partially on the basis of the left image data. For example, Y Calculation Logic included in the pixel information data generator 532-1 may generate data for left autofocus (Y data (L)) by averaging image data values (or color values) corresponding to four left photodiodes 501-1, 502-1, 503-1, and 504-1 (=(color value of R+color value of Gr+color value of B+color value of Gb)/4).

In an embodiment, the pixel information data generator 532-1 may generate right image data by subtracting left image data from raw image data. Pixel information data may generate data for right autofocus (Y data (R)) at least partially on the basis of the right image data. For example, Y Calculation Logic included in the pixel information data generator 532-1 may generate data for right autofocus (Y data (R)) by averaging image data values (or color values) corresponding to four right photodiodes 501-2, 502-2, 503-2, and 504-2.

In the above-described examples, although it is described that the data for phase autofocus is generated by averaging image data values corresponding to four photodiodes, the disclosure is not limited thereto. For example, the pixel information data generator 532-1 may generate data for phase autofocus by averaging image data values corresponding to photodiodes of a multiple of 4, for example, 8 photodiodes, 12 photodiodes, 16 photodiodes, or the like. In an embodiment, although FIG. 5B illustrates two Y Calculation Logics as independent components, the two Y Calculation Logics may be implemented (or integrated) as one component.

FIG. 5C is a diagram illustrating a pixel information data generator 532-2 according to another embodiment of the disclosure. For example, the pixel information data generator 532-2 of FIG. 5C may correspond to a component for generating data for auto white balance (or data necessary for an auto white balance operation).

Referring to FIG. 5C, the pixel information data generator 532-2 may generate binned (size-reduced) data for auto white balance at least partially on the basis of the left image data 535 (or right image data, or raw image data). For example, the pixel information data generator 532-2 may generate data for auto white balance having a reduced data size by performing 2*2 binning, for example, using an operation of summing four data values (or color values) corresponding to the same color among the left image data (e.g., R1, R2, R3, and R4) into a single data value (e.g., R1+R2+R3+R4). In the example of FIG. 5C, it is exemplified that four data values are summed into a single data value, but the disclosure is not limited thereto. For example, the pixel information data generator 532-2 may generate a data value for auto white balance by summing two or more data values having the same color into one data value.

In an embodiment, the pixel information data may generate data for motion of an external object (e.g., data for motion detection or data for motion prediction), or data for digital image stabilization (DIS). Since the method for generating data for motion of an external object or data for DIS may be applied in a method that is the same as or similar to that of FIG. 5B or 5C, a detailed description thereof will be omitted.

Returning back to FIG. 4, in an embodiment, the pixel information data generator 432 may deliver the generated pixel information data to the memory 433. In an embodiment, the pixel information data generator 432 may deliver the generated pixel information data to the combiner 435 without delivering the generated pixel information data to the memory 433.

In an embodiment, the memory 433 may store raw image data and pixel information data. In an embodiment, the memory 433 may deliver the stored raw image data or pixel information data to the compressor 434 or the combiner 435 under the control of the controller 436.

In an embodiment, the compressor 434 may compress the raw image data. In an embodiment, the compressor 434 may or may not compress the pixel information data. In an embodiment, although FIG. 4 illustrates that raw image data is compressed or pixel information data is optionally compressed using a single compressor 434, the disclosure is not limited thereto. For example, the device 400 may include a compressor for compressing only pixel information data, separate from the compressor 434 for compressing raw image data.

In an embodiment, the combiner 435 may couple (or combine) the compressed data and the pixel information data under the control of the controller 436. For example, the combiner 435 may couple (or combine) the compressed data and the pixel information data by a frame interleaving method or a line interleaving method under the control of the controller 436.

Hereinafter, a method of combining compressed data and pixel information data and transmitting the combined data by a frame interleaving method or a line interleaving method will be described in detail with reference to FIGS. 6 to 10.

Figure 6:
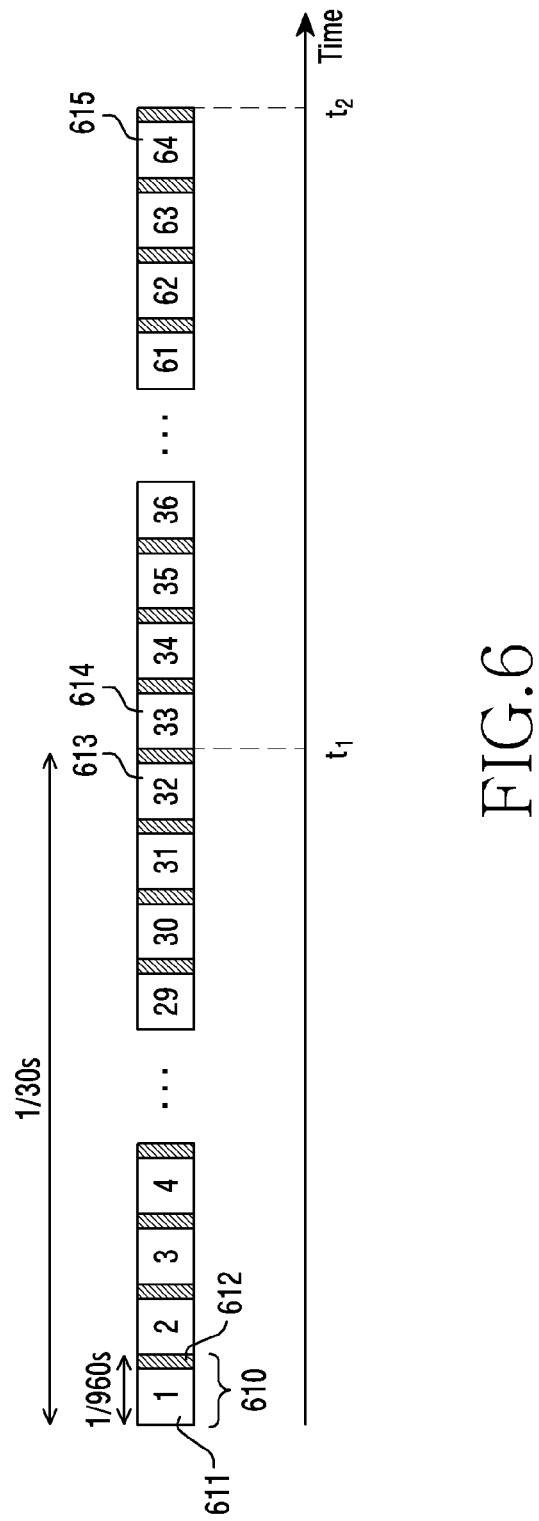
FIG. 6 is a diagram for explaining a method for transmitting data by a frame interleaving method according to an embodiment.

FIG. 6 is a diagram for explaining a method for transmitting data by a frame interleaving method according to an embodiment. For example, FIG. 6 is a diagram for explaining a method for transmitting data by a frame interleaving method when the raw image data acquisition speed is 960 fps and the pixel information data processing speed is 30 fps. In an embodiment, the raw image data acquisition speed may be determined (or adjusted) depending on at least one of the specification of the camera module 180 (or the image sensor module 410) and a mode for photographing an external object (e.g., a slow motion mode). In an embodiment, the speed for processing pixel information data may be determined (or adjusted) depending on at least one of the specification of the camera module 180 (or the image sensor module 410), the specification of the processor 450, and a mode for photographing an external object (e.g., a night photographing mode). For example, in the night photographing mode, it is necessary to collect a lot of light in order to generate a brighter image compared with the normal mode, and may increase the speed for processing pixel information data in order to collect a lot of light (e.g., adjusting the speed for processing the phase autofocus function from 30 fps to 60 fps). However, the disclosure is not limited thereto.

Referring to FIG. 6, a unit frame period may be 1/960 sec, which is equal to the image data acquisition period. In an embodiment, the combiner 435 may split pixel information data for one image frame (or compressed data for one image frame) into 32 (=960/30) pieces (or may call 32 pieces of split data from the memory 433) and may combine the split pixel information data (or the split data having a size of 1/32 of the entire pixel information data for one image frame) and compressed data for each unit frame 610. In an embodiment, in FIG. 6, pixel information data for one image frame may be transmitted while the compressed data for 32 image frames is transmitted via the interface. For example, while compressed data for image frame 1 611 to image frame 32 613 is transmitted, pixel information data for the image frame 1 611 may be transmitted at time t1 via the interface 340. In another example, while compressed data for image frame 33 614 to image frame 32 615 is transmitted, pixel information data for the image frame 33 614 may be transmitted at time t2 via the interface. In an embodiment, the period for transmitting pixel information data for one frame may be the same as the period for processing the pixel information data (e.g., 1/30 sec), and the period for transmitting split information data within the unit frame 610 may be the same as the period for acquiring the raw image data (e.g., 1/960 sec).

Figure 7:
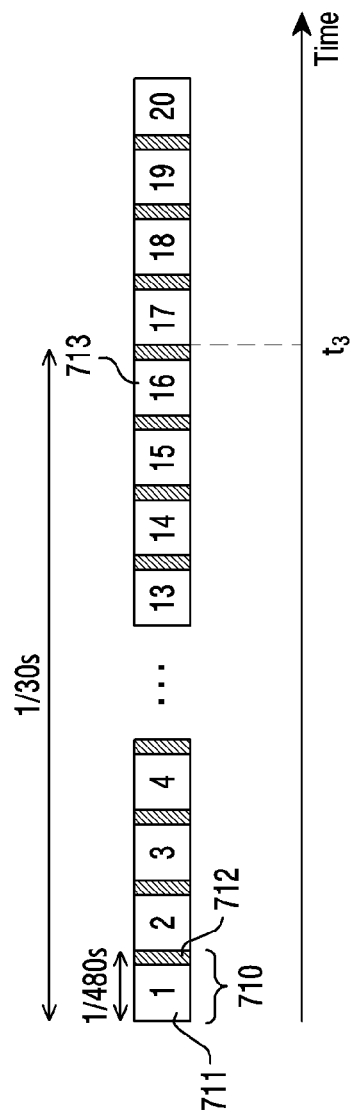
FIG. 7 is a diagram for explaining a method for transmitting data by a frame interleaving method according to another embodiment of the disclosure.

FIG. 7 is a diagram for explaining a method for transmitting data by a frame interleaving method according to another embodiment of the disclosure. For example, FIG. 7 is a diagram for explaining a method for transmitting data by a frame interleaving method when the raw image data acquisition speed is 480 fps and the pixel information data processing speed is 30 fps.

Referring to FIG. 7, a unit frame period may be 1/480 sec, which is equal to the image data acquisition period. In an embodiment, the combiner 435 may split pixel information data for one image frame into 16 (=480/30) pieces (or may call 16 pieces of split data from the memory 433) and may combine the split pixel information data (or the split data having a size of 1/16 of the entire pixel information data for one image frame) and compressed data for each unit frame 710. In an embodiment, in FIG. 7, pixel information data for one image frame may be transmitted while the compressed data for 16 image frames is transmitted via the interface 340. For example, while compressed data for image frame 1 711 to image frame 16 713, pixel information data for the image frame 1 711 may be transmitted at time t3 via the interface. In an embodiment, the period for transmitting pixel information data for one frame may be the same as the period for processing the pixel information data (e.g., 1/30 sec), and the period for transmitting split pixel information data for one frame may be the same as the period for acquiring the raw image data (e.g., 1/480 sec).

Figure 8:
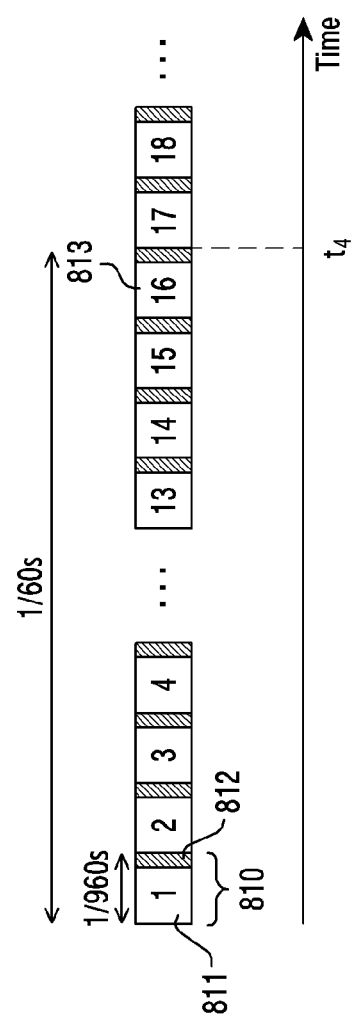
FIG. 8 is a diagram for explaining a method for transmitting data by a frame interleaving method according to still another embodiment of the disclosure.

FIG. 8 is a diagram for explaining a method for transmitting data by a frame interleaving method according to still another embodiment of the disclosure. For example, FIG. 8 is a diagram for explaining a method for transmitting data by a frame interleaving method when the raw image data acquisition speed is 960 fps and the pixel information data processing speed is 60 fps.

Referring to FIG. 8, a unit frame period may be 1/960 sec, which is equal to the image data acquisition period. In an embodiment, the combiner 435 may split pixel information data for one image frame into 16 (=960/60) pieces (or may call 16 pieces of split data from the memory 433) and may combine the split pixel information data 812 (or the split data having a size of 1/16 of the entire pixel information data for one image frame) and compressed data 811 for each unit frame 810. In an embodiment, in FIG. 8, pixel information data for one image frame may be transmitted while the compressed data for 16 image frames is transmitted via the interface 340. For example, while compressed data for image frame 1 811 to image frame 16 713 is transmitted, pixel information data for the image frame 1 811 may be transmitted at time t4 via the interface. In an embodiment, the period for transmitting pixel information data for one frame may be the same as the period for processing the pixel information data (e.g., 1/60 sec), and the period for transmitting split pixel information data for one frame may be the same as the period for acquiring the raw image data (e.g., 1/960 sec).

Figure 9:
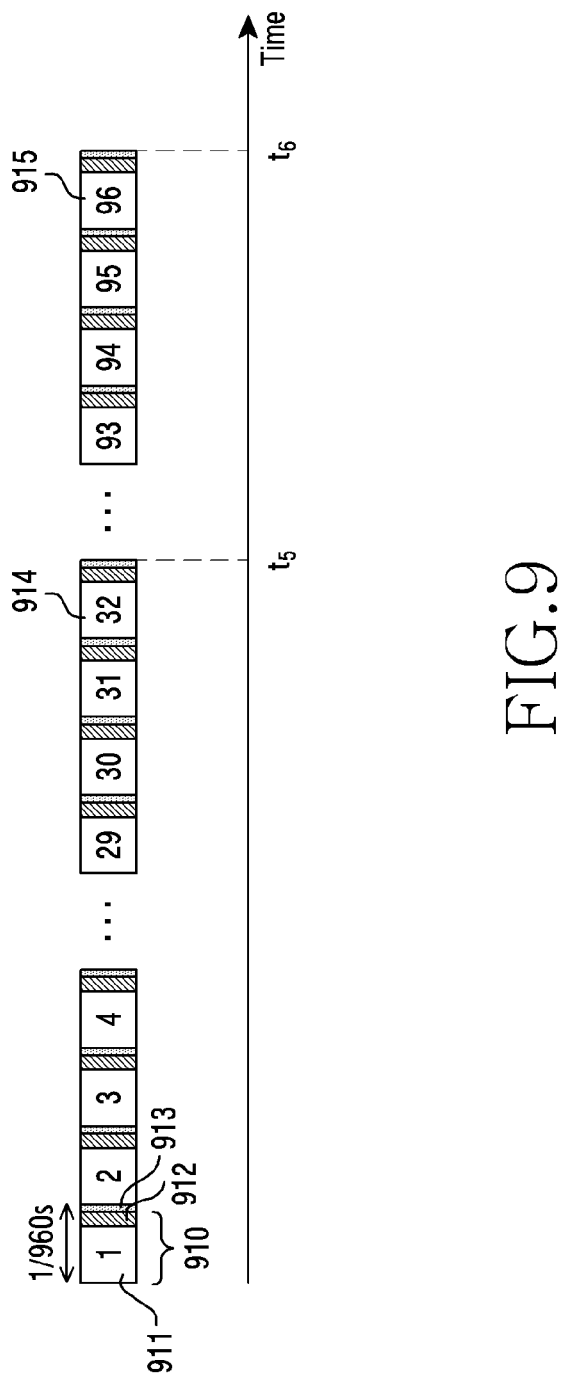
FIG. 9 is a diagram for explaining a method for transmitting data by a frame interleaving method according to still another embodiment of the disclosure.

FIG. 9 is a diagram for explaining a method for transmitting data by a frame interleaving method according to still another embodiment of the disclosure. For example, FIG. 9 is a diagram for explaining a method for transmitting data in the case in which there are a plurality of types of pixel information data (e.g., first pixel information data (e.g., data for phase autofocus) and second pixel information data (e.g., data for auto white balance)) by a frame interleaving method when the raw image data acquisition speed is 960 fps, the speed for processing the first pixel information data is 30 fps, and the speed for processing the second pixel information data is 10 fps.

Referring to FIG. 9, a unit frame period may be 1/960 sec, which is equal to the image data acquisition period. In an embodiment, the combiner 435 may split the first pixel information data for one image frame into 32 (=960/30) pieces and may split the second pixel information data for one image frame into 96 (=960/10) pieces. The combiner 435 combines split first pixel information data 912 and split second pixel information data 913 with compressed data 911 for one image frame for each unit frame 910. In an embodiment, in FIG. 9, the first pixel information data for one image frame may be transmitted while the compressed data for 32 image frames is transmitted via the interface 340. For example, while compressed data for image frame 1 911 to image frame 32 914 are transmitted, first pixel information data for the image frame 1 911 may be transmitted at time t5 via the interface 340. In another embodiment, in FIG. 9, the second pixel information data for one image frame may be transmitted while the compressed data for 96 image frames is transmitted via the interface. For example, while compressed data for image frame 1 911 to image frame 96 915 are transmitted, second pixel information data for the image frame 1 911 may be transmitted at time t6 via the interface 340.

In FIG. 9, it is exemplified that there are two types of pixel information data, but the disclosure is not limited thereto. For example, in a range in which the size of compressed data for one image frame and the split size of a plurality of types of pixel information data are equal to or smaller than the size of a unit frame, the plurality of types of pixel information data may be transmitted together with the compressed data in the method illustrated in FIG. 9.

Figure 10:
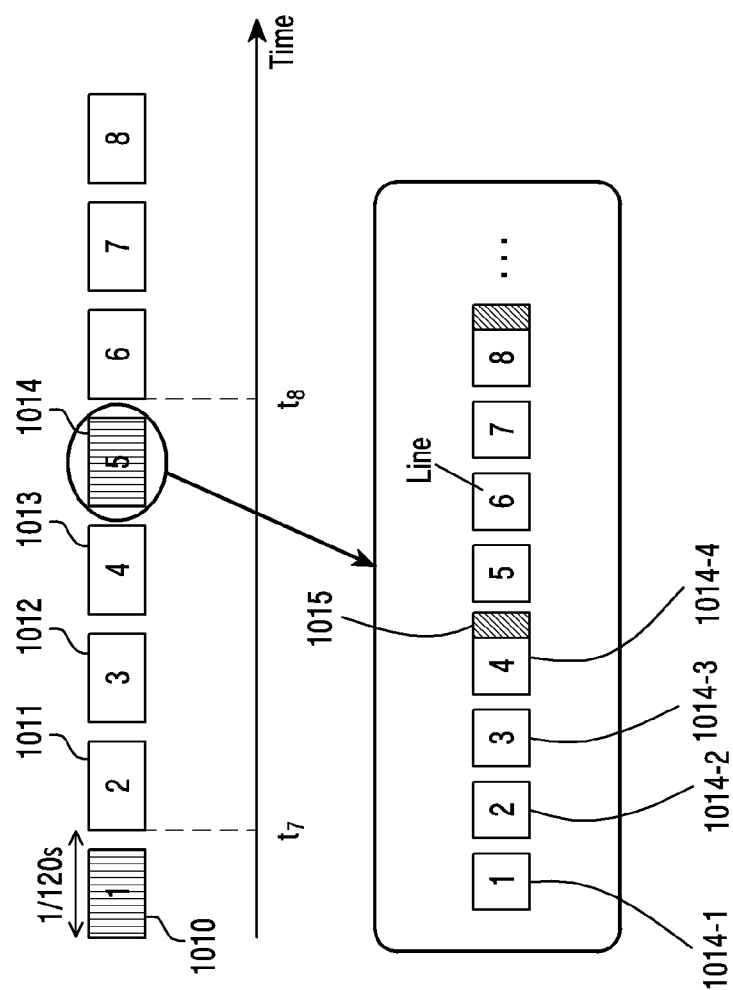
FIG. 10 is a diagram for explaining a method for transmitting data by a line interleaving method according to an embodiment of the disclosure.

FIG. 10 is a diagram for explaining a method for transmitting data by a line interleaving method according to an embodiment. For example, FIG. 10 exemplifies a case in which the raw image acquisition speed is 120 fps and the speed for processing pixel information data is 30 fps.

Referring to FIG. 10, the combiner 435 may combine one image frame and pixel information data of the one image frame within a unit frame 1010. For example, the combiner 435 may combine a part of the pixel information data between the designated intervals of the data lines within unit frame 5 1014. In an embodiment, the specified spacing of data lines may be determined according to a method of generating pixel information data in the data generator 432 (the number of pieces of image data corresponding to photodiodes summed (or averaged) in order to generate one piece of data that constitutes the pixel information data). For example, as illustrated in FIG. 5B, when one piece of data constituting pixel information data is generated by averaging image data corresponding to four photodiodes, the specified spacing of data lines may be four data lines. In an embodiment, the size of the split pixel information data to be combined for each specified data line may be the size obtained by multiplying the size of the pixel information data for one image frame by the ratio of the specified spacing of the data lines relative to the total number of data lines of the compressed data. For example, as illustrated in FIG. 10, when the designated data line spacing is four data lines 1014-1 to 1014-4 and the total number of data lines of compressed data included in a unit frame is 20, the size of split pixel information data 1014-4 combined with each specified data line may be the size obtained by multiplying the size of the pixel information data for one image frame by ⅕.

For example, the combiner 435 may combine pixel information data for one image frame after all the data line of compressed data for one frame (e.g., 20 data lines) within a unit frame. For example, within unit frame 5 1014, non-split pixel information data for one image frame may be combined after the compressed data lines for one image frame.

In an embodiment, unit frames (e.g., unit frame 2 1011, unit frame 3 1012, and unit frame 4 1014) other than unit frames which are combined with compressed data and pixel information data (e.g., unit frame 1 1010 and unit frame 5 1014), may include only compressed data for one image frame without being combined with pixel information data.

In an embodiment, when the compressed data and the pixel information data are combined by a line interleaving method as in FIG. 10, the period for transmitting the pixel information data may be the same as the period for processing the pixel information data. For example, when the period for processing the pixel information data is ⅕₀ sec, a unit frame in which compressed data and pixel information data are combined may be transmitted to the processor 450 every ⅕₀ sec. For example, unit frame 1 in which compressed data and pixel information data are combined may be transmitted at time t7, and unit frame 5 in which compressed data and pixel information data are combined may be transmitted at time t8 which is a time after ⅕₀ sec.

Returning back to FIG. 4, in an embodiment, the image sensor module 410 may determine whether to compressed pixel information data obtained by compressing pixel information data or uncompressed pixel information data to the processor 450.

In an embodiment, when the size of the pixel information data is smaller than a specified threshold value (hereinafter, referred to as a "first threshold value"), the image sensor module 410 may determine to transmit the pixel information data after combining the same with compressed data without compressing the pixel information data. In an embodiment, when the size of the pixel information data is smaller than the first threshold value, a method of transmitting the pixel information data after combining the same with compressed data without compressing the pixel information data may be advantageous in terms of power consumed for data transmission.

In an embodiment, when the size of the pixel information data is equal to or greater than the first threshold value, the image sensor module 410 may compress the pixel information data. The image sensor module 410 may identify the size of the compressed pixel information data and the size of the uncompressed pixel information data. In an embodiment, when the size of the pixel information data is equal to greater than a specified threshold value (hereinafter, referred to as a "second threshold value"), the image sensor module 410 may determine to transmit the compressed pixel information data to the processor 450 after combining the same with compressed data. In another embodiment, when the size of the pixel information data is smaller than the second threshold value, the image sensor module 410 may determine to transmit the uncompressed pixel information data to the processor 450 after combining the same with compressed data.

Figure 11:
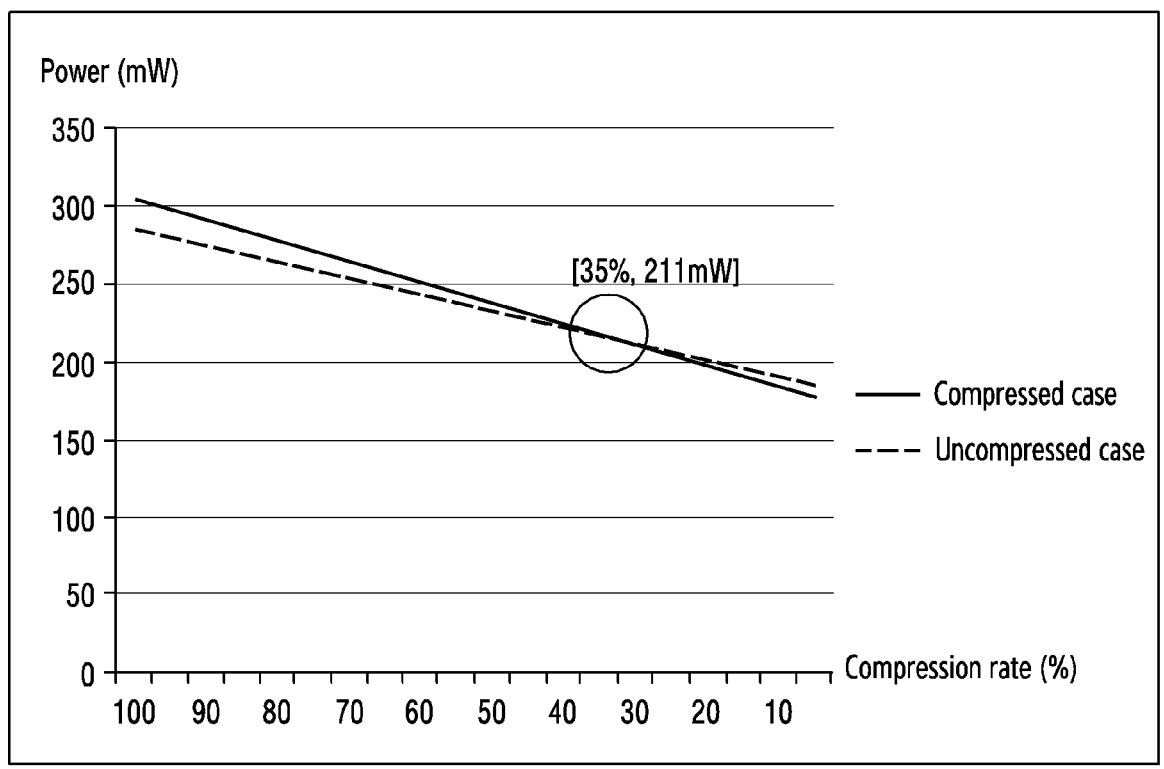
FIG. 11 is a diagram for explaining the compression of pixel information data according to an embodiment of the disclosure.

FIG. 11 is a diagram for explaining the compression of pixel information data according to an embodiment of the disclosure; For example, FIG. 11 is a diagram for explaining a principle of determining compressed pixel information data or uncompressed pixel information data as data to be transmitted to the processor 450 depending on the compression ratio of pixel information data.

Referring to FIG. 11, when the compression ratio of data is greater than a specified threshold value, power consumed for data transmission may be reduced when the data is compressed and then the compressed data is transmitted.

For example, in FIG. 11, when the size of the data after compression is compressed to 35% or less of the size of the data before compression (or when the compression ratio of the data is 65% or more), transmitting compressed data may be advantageous in terms of power. When the size of the data after compression is compressed to 35% or more of the size of the data before compression (or when the compression ratio of the data is 65% or less), transmitting uncompressed data may be advantageous in terms of power. In an embodiment, when the compression ratio of the pixel information data is 65% or more, the image sensor module 410 may transmit the compressed pixel information data to the processor 450, and when the compression ratio of the pixel information data is less than 65%, the uncompressed pixel information data may be transmitted to the processor 450. However, the disclosure is not limited thereto.

In an embodiment, when the size of the pixel information data is equal to or greater than the first threshold value, the image sensor module 410 may determine the compression rate of pixel information data every pixel information data transmission period, and may determine whether to transmit compressed pixel information data compressed according to the determined compression rate or uncompressed pixel information data to the processor 450.

In another embodiment, when the size of the pixel information data is equal to or greater than the first threshold value, the image sensor module 410 may transmit pixel information data corresponding to the current period to the processor 450 in a compressed state or a uncompressed state without determining the compression rate of the pixel information data corresponding to the current period (or without comparing the compression rate of the pixel information data with the second threshold value) according to information of the compression of the pixel information data transmitted in the previous period. For example, when the pixel information data transmitted in the previous period was transmitted to the processor 450 in the compressed state, the image sensor module 410 may compress the pixel information data corresponding to the current period and may then transmit the compressed information data to the processor 450. In another example, when the pixel information data transmitted in the previous period was transmitted to the processor 450 in the compressed state and the compression rate of the pixel information data to be transmitted in the current period is predicted to be equal to or similar to that of the pixel information data transmitted in the previous period (e.g., when settings associated with photographing control of an external object, such as a raw data acquisition speed or a speed for processing pixel information data, are maintained), the image sensor module 410 may compress the pixel information data corresponding to the current period and may then transmit the compressed pixel information data to the processor 450.

Returning back to FIG. 4, the image sensor module 410 may transmit data in which compressed data and pixel information data are combined to the input interface 451 of the processor 450 via the output interface 437.

In an embodiment, the processor 450 may store, in the memory 452, data in which the compressed data received via the input interface 451 and the pixel information data are combined. In an embodiment, the processor 450 may store the compressed data in the memory 452, but may deliver the pixel information data to the pixel information processor without storing the pixel information data in the memory 452.

In an embodiment, a decompressor 453 may decompress the compressed data. In an embodiment, the decompressor 453 may decompress the compressed data and the pixel information data. For example, the decompressor 453 may decompress the compressed pixel information data when the pixel information data is transmitted from the image sensor module 410 to the processor 450 in the compressed state. In an embodiment, although FIG. 4 illustrates that raw image data is decompressed or optionally the pixel information data is decompressed using a single decompressor 453, the disclosure is not limited thereto. For example, the device 400 may include a decompressor for decompressing only pixel information data, separate from the decompressor 453 for decompressing raw image data.

In an embodiment, a splitter 454 splits raw image data and pixel information data from the decompressed data. In an embodiment, the splitter 454 may deliver the decompressed compressed data to the ISP 455, and deliver the decompressed pixel information data to the pixel information data processor 456.

In an embodiment, the ISP 455 may perform functions, which are the same as or similar to those of the image signal processor 260 of FIG. 2, and a detailed description thereof will be omitted.

In an embodiment, the pixel information data processor 456 may process pixel information data. For example, when the pixel information data is data for phase autofocus, the pixel information data processor 456 may determine a distance between a lens and an image sensor for focusing (or for adjusting a focus) (or a distance to which the lens is to be moved) at least partially on the basis of the pixel information data. In another example, when the pixel information data is data for auto white balance, the pixel information data processor 456 may determine a color temperature of light to be corrected (or adjusted) at least partially on the basis of the pixel information data. However, the disclosure is not limited thereto.

In an embodiment, the processor 450 may transmit information about the image data acquisition speed (or period) and information about the speed of processing the pixel information data to the image sensor module 410.

In an embodiment, the processor 450 may determine a method of combining data to be transmitted from the image sensor module 410 to the processor 450 (e.g., a frame interleaving method or a line interleaving method), and may transmit the determined method to the image sensor module 410.

In an embodiment, when the processor 450 determines that the method of combining data to be transmitted from the image sensor module 410 to the processor 450 is a frame interleaving method, the processor 450 may determine the number of split pieces of pixel information data (or the ratio of splitting pixel information data) and may transmit information about the determined number of split pieces of pixel information data to the image sensor module 410.

In an embodiment, when the processor 450 determines that the method of combining data to be transmitted from the image sensor module 410 to the processor 450 is a line interleaving method, the processor 450 may determine a data line spacing into which the split pixel information data is to be interleaved (or combined), a split ratio of the pixel information data (or the size of the split pixel information data), or the like within compressed data for one image frame, and may transmit information about the determined data line spacing and the split ratio of the pixel information data to the image sensor module 410.

An electronic device according to various embodiments of the disclosure may include a processor and an image sensor module electrically connected to the processor. The image sensor module may include an image sensor and a control circuit electrically connected to the image sensor and connected to the processor via an interface. The control circuit may be configured to: receive a signal for photographing an external object; acquire a plurality of pieces of raw image data for the external object using the image sensor; generate pixel information data associated with control of the photographing of the processor using at least some of the obtained plurality of pieces of acquired raw image data; generate compressed data obtained by compressing at least some of the plurality of pieces of raw image data; transmit the pixel information data to the processor in accordance with a transmission period specified by the processor or the control circuit; and transmit the compressed data to the processor.

In various embodiments, the control circuit may be configured to: generate compressed pixel information data by compressing the pixel information data; transmit the compressed pixel information data to the processor when a compression rate of the compressed pixel information data satisfies a specified compression rate; and transmit uncompressed pixel information data to the processor when the compression rate does not satisfy the specified compression rate.

In various embodiments, the control circuit may be configured to: transmit the pixel information data to the processor without compressing when the pixel information data has a size smaller than a specified size; and compress the pixel information when the pixel information data has a size smaller than the specified size.

In various embodiments, the dual sensor may include a dual pixel image sensor including a pixel in which two or more photosensitive diodes are arranged, and the control circuit may be configured to generate the pixel information data based on a phase difference caused by the arrangement identified in the at least some of the plurality of pieces of raw image data.

In various embodiments, the pixel information data may include at least one of data for phase autofocus, data for auto white balance, data for motion of an external object, and data for digital image stabilization (DIS).

In various embodiments, the control circuit may be configured to: identify a sum of a size of compressed data for one image frame and a size of pixel information data for the one image frame, and a maximum capacity capable of being transmitted by the interface for one period; and determine a frame interleaving method of combining split data obtained by splitting the compressed data for the one image frame and the compressed data for the one image frame for one period for transmitting data by the interface as a method of combining the compressed data and the pixel information data when the sum exceeds the maximum capacity.

In various embodiments, the control circuit may be configured to split the pixel information data for the one image frame into split data when the frame interleaving method is determined as the method of combining the compressed data and the pixel information data, wherein the number of pieces of split data substantially corresponds to a number obtained by dividing a speed for transmitting the raw image by the image sensor by a speed for processing the pixel information data.

In various embodiments, the control circuit may be configured to: determine the frame interleaving method as the method of combining the compressed data and the pixel information data; and combine, when there are a plurality of types of pixel information data, split data obtained by splitting pixel information data corresponding to each of the plurality of types for the one image frame and the compressed data for the one image frame.

In various embodiments, the control circuit may be configured to identify the attribute of the pixel information data when the sum is equal to or smaller than the maximum capacity. The control circuitry may be configured to determine a line interleaving method of combining at least a part of the pixel information data for the one image frame with every specified data line spacing of the compressed data for the one image frame and transmitting the data for one period for transmitting the data by the interface as the method of combining the compressed data and the pixel information data when the attribute of the pixel information data corresponds to an attribute that requires fast processing in the processor.

In various embodiments, the control circuit may determine the frame interleaving method as the method of combining the compressed data and the pixel information data when the attribute of the pixel information data does not correspond to an attribute set to cause fast processing being performed in the processor.

Figure 12:
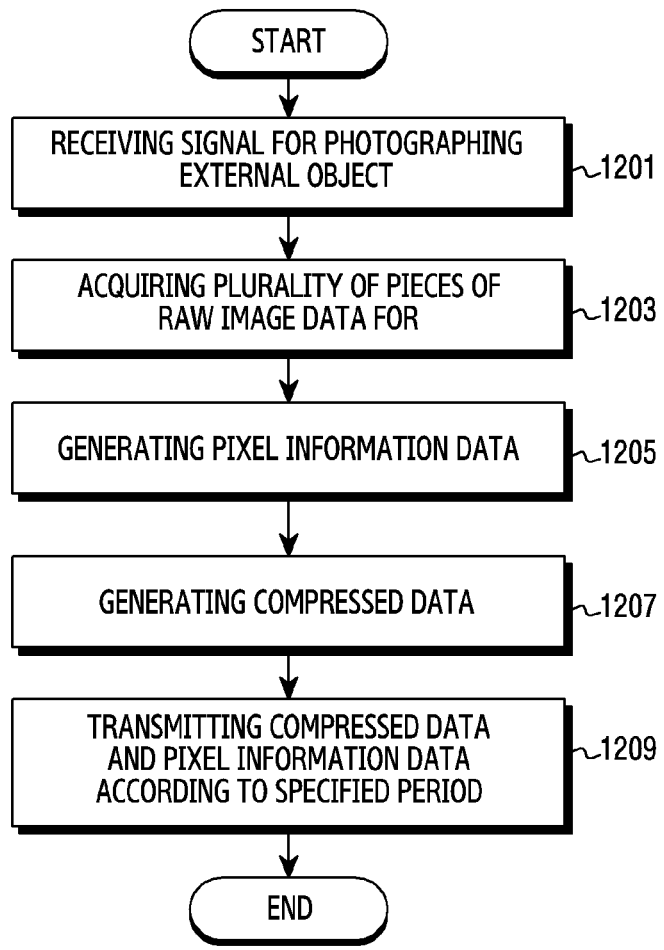
FIG. 12 is a diagram for explaining a method for transmitting data associated with control of image capture according to an embodiment of the disclosure.

FIG. 12 is a diagram for explaining a method of transmitting image data and data associated with control of image capture according to an embodiment of the disclosure.

Referring to FIG. 12, in operation 1201, the control circuit 330 may receive an input for photographing an external object.

For example, the control circuit 330 may receive a signal (or input) for providing a live view (or preview) for an external object via a display (e.g., the display device 160).

In another example, the control circuit 330 may receive a signal for executing a half shutter function for adjusting a focal length (or focusing) with respect to an external object while providing the live view. In still another example, the control circuit 330 may receive a signal for capturing a still image or a moving image. However, the signal for photographing an external object is not limited to the above-mentioned examples.

In operation 1203, the control circuit 330 may acquire a plurality of pieces of raw image data for an external object using the image sensor 320. For example, the control circuit 330 may generate a plurality of pieces of raw image data for an external object by converting analog electrical signals delivered from the plurality of pixels into digital electrical signals.

In an embodiment, when the image sensor 320 is implemented as a dual pixel image sensor, the control circuit 330 may generate raw image data by coupling (combining): left image data, which is generated on the basis of electrical signals generated from photodiodes composed of photodiodes, each of which is disposed on one side (or column or row) of each pixel in at least some of a plurality of pixels, and corresponds to one side (e.g., left side); and right image data, which is generated on the basis of electrical signals generated from photodiodes composed of photodiodes, each of which is disposed on the other side (e.g., right side) of each pixel, and corresponds to the other side (e.g., right side). In an embodiment, the control circuit 330 may store the generated raw image data in memory (e.g., the memory 433).

In operation 1205, the control circuit 330 may generate pixel information data.

In one embodiment, the pixel information data may be data generated at least partially on the basis of image data (e.g., at least one of raw image data, left image data, or right image data) and associated with photographing control of the processor 350 when the image sensor 320 is implemented as a dual image sensor. For example, the pixel information data may include at least one of data for phase autofocus, data for auto white balance, data for motion of an external object (e.g., data for motion detection or data for motion prediction), or data for digital image stabilization (DIS). However, the pixel information data is not limited to the above-mentioned examples. In an embodiment, the control circuit 330 may store the generated pixel information data in memory (e.g., the memory 433).

In operation 1207, the control circuit 330 may generate compressed data obtained by compressing the raw image data.

In an embodiment, the control circuit 330 may compress raw image data and optionally pixel information data. For example, the control circuit 330 may compress the raw image data in order to reduce the size of the raw image data. The control circuit 330 may generate compressed data by compressing the raw image data. The control circuit 330 may or may not compress pixel information data. For example, the control circuit 330 may identify the size of the pixel information data. When the size of the pixel information data is less than a predetermined threshold value, the control circuit 330 may not compress the pixel information data. When the size of the pixel information data is equal to or greater than a specified threshold value, the control circuit 330 may compress the pixel information data.

In operation 1209, the control circuit 330 may transmit the compressed data, and may transmit the pixel information data to the processor 350 according to a transmission period specified by the processor 350 or the control circuit 330.

In an embodiment, the control circuit 330 may transmit the pixel information data to the processor 350 according to a transmission period specified by the processor 350 or the control circuit 330.

In an embodiment, the period for transmitting the pixel information data to the processor 350 may be determined independently of the period for transmitting the compressed data to the processor 350. For example, the period for transmitting the pixel information data to the processor 350 may be specified (determined) depending on a period for processing the pixel information data by the processor (or a period set for processing or a specification for processing the pixel information data). In another example, a period for transmitting the pixel information data to the processor 350 may be specified by the control circuit 330.

In an embodiment, the control circuit 330 may identify the size of the compressed data and the size of the pixel information data (or the sum of the size of the compressed data and the size of the pixel information data) and may identify a unit frame size.

In an embodiment, when the control circuit 330 determines that the size of the compressed data and the size of the pixel information data exceed the unit frame size, the control circuit 330 may combine the compressed data and the pixel information data by a frame interleaving method.

In another embodiment, when the control circuit 330 determines that the size of the compressed data and the size of the pixel information data is equal to or smaller than the unit frame size, the control circuit 330 may combine the compressed data and the pixel information data by a line interleaving method.

In an embodiment, the control circuit 330 may determine the method of transmitting the pixel information data (or combining the pixel information data with the compressed data) (e.g., the frame interleaving method or the line interleaving method) at least partially on the basis of the attribute of the pixel information data.

In an embodiment, the attributes of the pixel information data may include the time required by the processor 350 to process the pixel information data, in addition to the type of pixel information data (e.g., data for autofocus, or data for auto white balance).

In an embodiment, the control circuit 330 may combine the compressed data and the information data according to the frame interleaving method or the line interleaving method (or the determined transmission period of the pixel information data) and may transmit the combined data to the processor 350 via the interface 340. In an embodiment, the interface 340 may be a mobile industry processor interface (MIPI). However, the disclosure is not limited thereto, and all of the data transmission standards capable of transmitting data between components (or chips) inside the electronic device are applicable.

Figure 13:
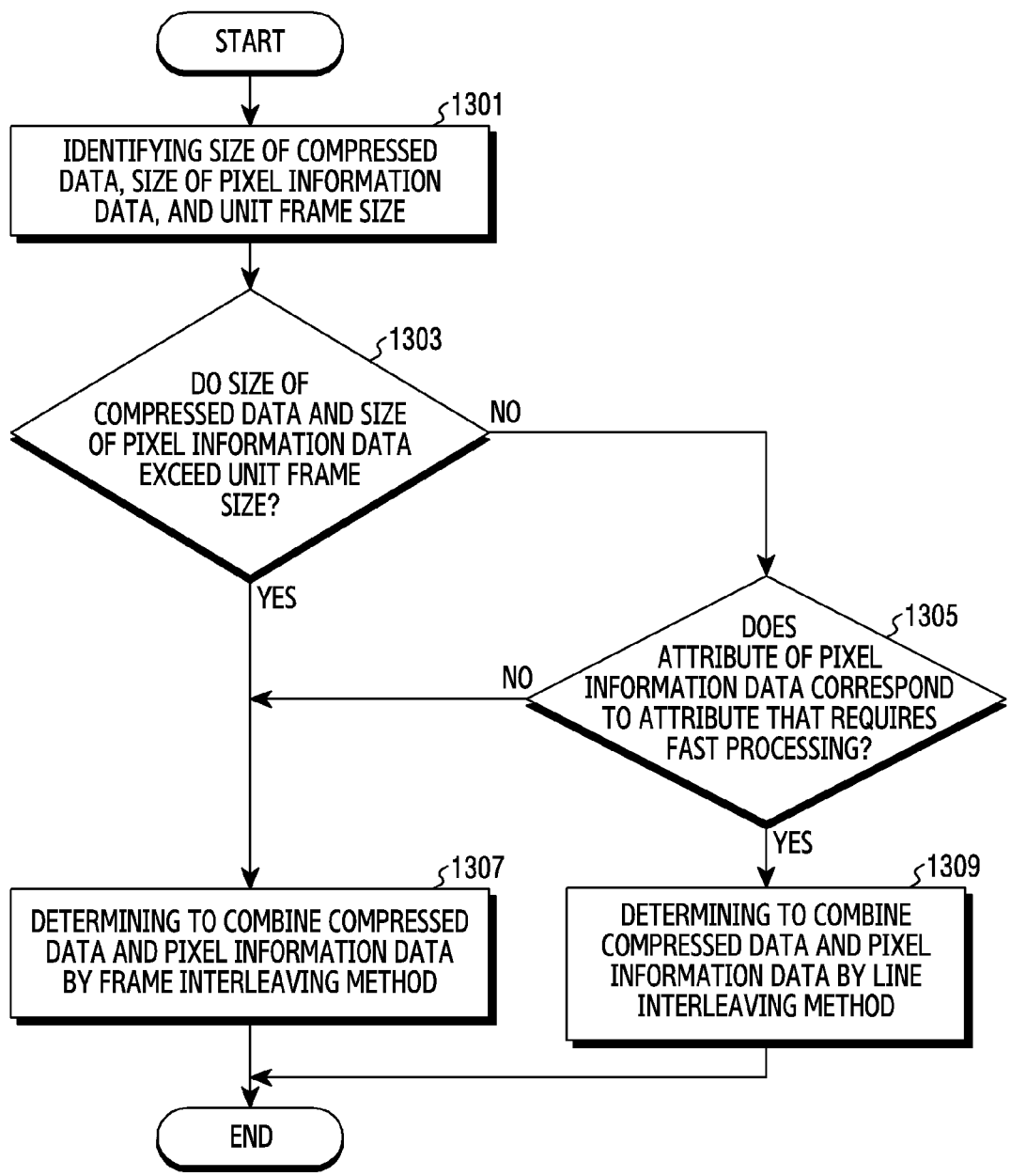
FIG. 13 is a diagram for explaining a method of determining a method of combining compressed data and pixel information data according to an embodiment of the disclosure.

FIG. 13 is a diagram for explaining a method of combining compressed data and pixel information data according to an embodiment of the disclosure.

Referring to FIG. 13, in operation 1301, the control circuit 330 may identify the size of the compressed data and the size of the pixel information data (or the sum of the size of the compressed data and the size of the pixel information data) and may identify a unit frame size. For example, the control circuit 330 may identify the size of the compressed data and the size of the pixel information data stored in the memory. The control circuit 330 may identify the unit frame size at least partially on the basis of a speed for transmitting the unit frame by the interface 340 (or the data transmission rate of the interface 340) and the period of the unit frame. However, the disclosure is not limited thereto.

In operation 1303, the control circuit 330 may determine whether the size of the compressed data and the size of the pixel information data exceed the unit frame size.

In an embodiment, the control circuit 330 may determine whether or not the sum of the size of compressed data obtained by compressing a raw image data corresponding to one image frame and the size of pixel information data generated at least partially on the basis of one image frame (or pixel image data for one image frame) exceeds the unit frame size.

In an embodiment, the control circuit 330 may determine whether or not the compressed data (or data obtained by compressing the raw image data for one image frame) and the pixel information (or the pixel information data for one image frame) and transmittable simultaneously (or at once) within the unit frame for the unit frame period for the interface 340 between the image sensor module 310 and the processor 350.

When the control circuit 330 determines in operation 1303 that the size of the compressed data and the size of the pixel information data do not exceed the unit frame size, in operation 1305, the control circuit 330 may identify the attribute of the pixel information data and may determine whether an attribute of the pixel information data corresponds to an attribute that requires fast processing. For example, the control circuit 330 may identify at least one of, for example, the type of pixel information data (e.g., data for autofocus, or data for auto white balance) and the time required by the processor 350 to process the pixel information data as the attribute the pixel information data. The control circuit 330 may determine whether the attribute of the pixel information data requires fast processing in the processor 350 at least partially on the basis of at least one of the type of the pixel information data and the time required to process the pixel information data.

When the control circuit 330 determines that the size of the compressed data and the size of the pixel information data exceed the unit frame size in operation 1303 or when the control circuit 330 determines that the attribute of the pixel information data corresponds to an attribute that does not require fast processing in operation 1305, the control circuit 330 may determine to combine the compressed data and the pixel information data by a frame interleaving method in operation 1307.

When the control circuit 330 determines in step 1305 that the attribute of the pixel information data corresponds to an attribute that requires rapid processing, the control circuit 330 may determine to combine the compressed data and the pixel information data by a line interleaving method in operation 1309.

Figure 14:
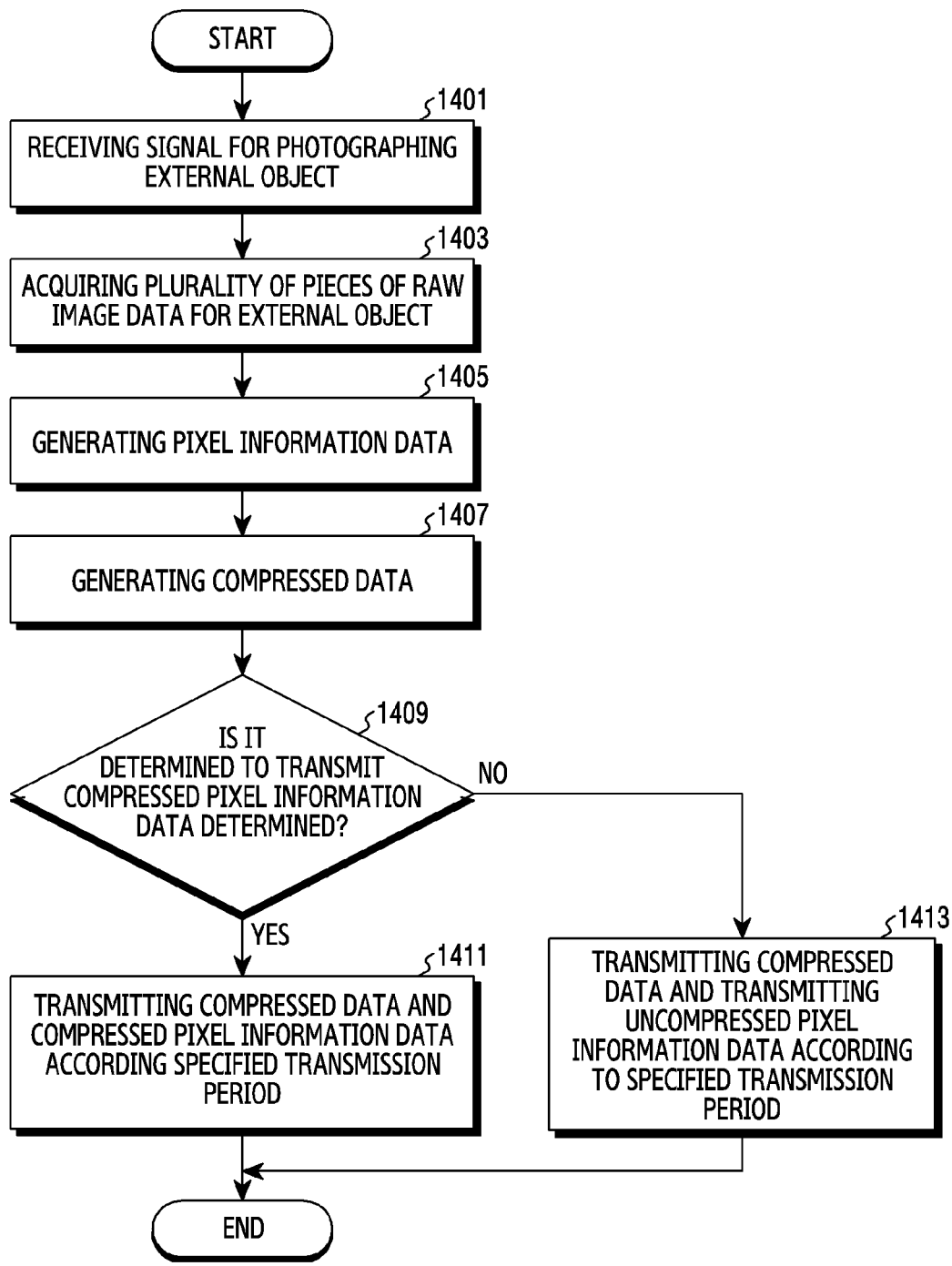
FIG. 14 is a diagram for explaining a method of transmitting image data and data associated with control of image capture according to another embodiment of the disclosure.

FIG. 14 is a diagram for explaining a method of transmitting image data and data associated with control of image capture according to another embodiment of the disclosure.

Referring to FIG. 14, in operation 1401, the control circuit 330 may receive an input for photographing an external object.

In operation 1403, the control circuit 330 may acquire a plurality of pieces of raw image data for an external object using an image sensor.

In operation 1405, the control circuit 330 may generate pixel information data.

In operation 1407, the control circuit 330 may generate compressed data obtained by compressing the raw image data.

Since operations 1401 to 1407 of FIG. 14 are at least partially the same as or similar to operations 1201 to 1207 of FIG. 12, detailed descriptions thereof will be omitted.

In operation 1409, the control circuit 330 may determine whether to transmit the compressed pixel information data. For example, the control circuit 330 may determine whether to compress the pixel information data, and when it is determined to compress the pixel information data, the control circuit 330 may determine whether to transmit compressed pixel information data or uncompressed pixel information data. Hereinbelow, the operation of determining whether to transmit compressed pixel information data will be described in detail with reference to FIG. 15.

Figure 15:
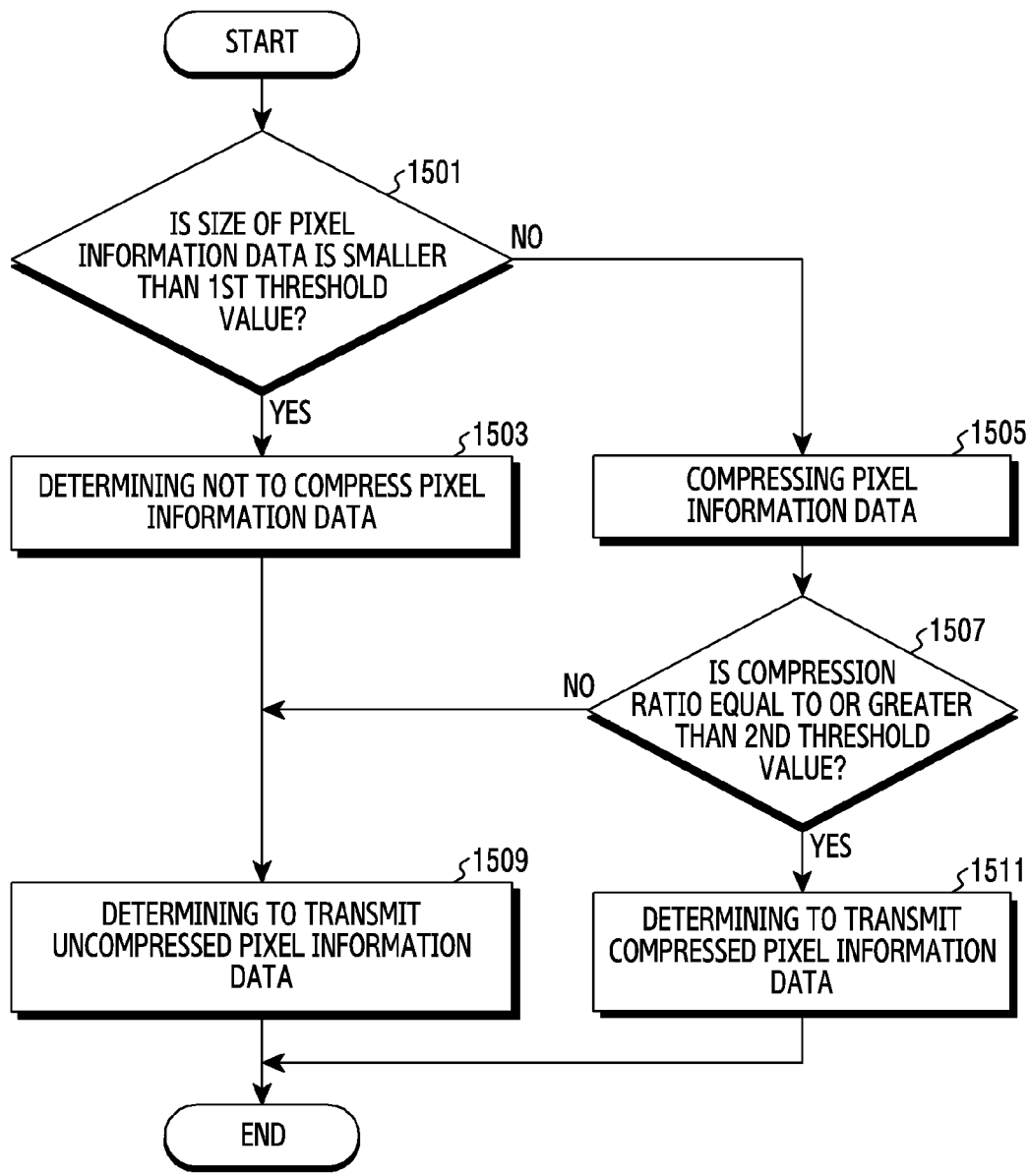
FIG. 15 illustrates a method for determining whether to transmit compressed pixel information data or uncompressed pixel information data according to an embodiment of the disclosure.

FIG. 15 illustrates a method for determining whether to transmit compressed pixel information data or uncompressed pixel information data according to an embodiment of the disclosure.

Referring to FIG. 15, in operation 1501, the control circuit 330 may determine whether the size of pixel information data is smaller than a first threshold value.

When the control circuit 330 determines that the size of the pixel information data is smaller than the first threshold value in operation 1501, the control circuit 330 may determine not to compress the pixel information data in operation 1503. For example, when the size of the pixel information data is smaller than the first threshold value, the compression rate of the data may be small even if the pixel information data is compressed. In another example, when the size of the pixel information data is smaller than the first threshold value, the difference between the size of the pixel information data before compression and the size of the pixel information data after compression may be small even if the pixel information data is compressed and even if the data compression rate is large. In a still another example, when the size of the pixel information data is smaller than the first threshold value, while the difference between the size of the pixel information data before compression and the size of the pixel information data after compression is small, power consumed for the operation of compressing the pixel information data may be large.

When the control circuit 330 determines that the size of pixel information data is equal to or greater than the first threshold value in operation 1501, the control circuit 330 may determine to compress the pixel information data (or may compress the pixel information data) in operation 1505.

In operation 1507, the control circuit 330 may determine whether or not the compression ratio is equal to or greater than the second threshold value.

When the control circuit 330 determines that the compression ratio of pixel information data is smaller than the second threshold value in operation 1507, the control circuit 330 may determine to transmit uncompressed pixel information data to the processor 350 in the state of being combined with compressed data in operation 1509.

When the control circuit 330 determines that the compression ratio of pixel information data is equal to or greater than the second threshold value in operation 1507, the control circuit 330 may determine to transmit uncompressed pixel information data to the processor 350 in the state of being combined with compressed data in operation 1511.

Although not illustrated in FIG. 15, in an embodiment, when the size of the pixel information data is equal to or greater than the first threshold value, the control circuit 330 may determine the compression rate of pixel information data every pixel information data transmission period, and may determine whether to transmit compressed pixel information data compressed according to the determined compression rate or uncompressed pixel information data to the processor 350.

In another embodiment, when the size of the pixel information data is equal to or greater than the first threshold value, the control circuit 330 may transmit pixel information data corresponding to the current period to the processor 350 in a compressed state or a uncompressed state without determining the compression rate of the pixel information data corresponding to the current period (or without comparing the compression rate of the pixel information data with the second threshold value) according to information of the compression of the pixel information data transmitted in the previous period. For example, when the pixel information data transmitted in the previous period was transmitted to the processor 350 in the compressed state, the control circuit 330 may compress the pixel information data corresponding to the current period and may then transmit the compressed information data to the processor 350. In another example, when the pixel information data transmitted in the previous period was transmitted to the processor 350 in the compressed state and the compression rate of the pixel information data to be transmitted in the current period is predicted to be equal to or similar to that of the pixel information data transmitted in the previous period (e.g., when settings associated with photographing control of an external object, such as a raw data acquisition speed or a speed for processing pixel information data, are maintained), the control circuit 330 may compress the pixel information data corresponding to the current period and may then transmit the compressed pixel information data to the processor 350.

Returning back to FIG. 14, when it is determined in operation 1409 that the compressed pixel information data is to be transmitted, the control circuit 330 may transmit compressed data and may transmit the compressed pixel information data according to a specified transmission period in operation 14011.

In an embodiment, the control circuit 330 may identify the size of the compressed data and the size of the compressed pixel information data (or the sum of the size of the compressed data and the size of the compressed pixel information data) and may identify a unit frame size.

In an embodiment, when the control circuit 330 determines that the size of the compressed data and the size of the compressed pixel information data exceed the unit frame size, or when the control circuit 330 determines that the attribute of the pixel information data corresponds to an attribute that requires fast processing even though the size of the compressed data and the size of the compressed pixel information data do not exceed the unit frame size, the control circuit 330 may determine to combine the compressed data and the pixel information data by a frame interleaving method. In another embodiment, when the control circuit 330 determines that the size of the compressed data and the size of the compressed pixel information data are equal to or smaller than the unit frame size and that the attribute of the compress pixel information data corresponds to an attribute that requires rapid processing, the control circuit 330 may combine the compressed data and the compressed pixel information data by a line interleaving method.

In an embodiment, the control circuit 330 may transmit data in which the compressed data and the compressed pixel information data are combined to the processor 350.

When it is determined in operation 1409 that uncompressed pixel information data is to be transmitted, compressed data may be transmitted, and the compressed pixel information data may be transmitted according to a specified transmission period.

In an embodiment, the control circuit 330 may identify the size of the compressed data and the size of the uncompressed pixel information data (or the sum of the size of the compressed data and the size of the uncompressed pixel information data) and may identify a unit frame size.

In an embodiment, when the control circuit 330 determines that the size of the compressed data and the size of the uncompressed pixel information data exceed the unit frame size, or when the control circuit 330 determines that the attribute of the pixel information data corresponds to an attribute that requires fast processing even though the size of the compressed data and the size of the uncompressed pixel information data do not exceed the unit frame size, the control circuit 330 may determine to combine the compressed data and the pixel information data by a frame interleaving method.

In another embodiment, when the control circuit 330 determines that the size of the compressed data and the size of the uncompressed pixel information data are equal to or smaller than the unit frame size and that the attribute of the uncompressed pixel information data corresponds to an attribute that requires rapid processing, the control circuit 330 may combine the compressed data and the uncompressed pixel information data by a line interleaving method.

In an embodiment, the control circuit 330 may transmit data in which the compressed data and the uncompressed pixel information data are combined to the processor 350.

A method for transmitting image data and data associated with control of image capture according to various embodiments of the disclosure may include: an operation of receiving a signal for photographing an external object by a control circuit included in a sensor module including an image sensor; an operation of acquiring a plurality of pieces of raw image data for the external object using the image sensor by the control circuit; an operation of generating pixel information data associated with the image capture of a processor electrically connected to the image sensor module and connected to the control circuit via an interface, using at least some of the acquired plurality of pieces of raw image data by the control circuit; an operation of generating compressed data obtained by compressing at least some of the plurality of pieces of raw image data; an operation of transmitting the pixel information data to the processor according to a transmission period specified by the processor or the control circuit; and an operation of transmitting the compressed data to the processor.

In various embodiments, the method may further include an operation of generating compressed pixel information data by compressing the pixel information data. The operation of transmitting the pixel information data to the processor according to the determined transmission period may include: an operation of transmitting the compressed pixel information data to the processor when a compression rate of the compressed pixel information data satisfies a specified compression rate; and an operation of transmitting uncompressed pixel information data to the processor when the compression rate does not satisfy the specified compression rate.

In various embodiments, the operation of transmitting the pixel information data to the processor according to the transmission period specified by the processor or the control circuit may further include an operation of transmitting the pixel information data to the processor without compressing the pixel information data when the size of the pixel information data is smaller than the specified size, and the operation of generating the compressed pixel information data by compressing the pixel information data may further include an operation of compressing the pixel information data when the size of the pixel information data is equal to or greater than the specified size.

In various embodiments, the image sensor may include a dual pixel image sensor including a pixel in which two or more photosensitive diodes are arranged, and the image sensor may be configured to generate the pixel information data based on a phase difference caused by the arrangement identified in the at least some of the plurality of pieces of raw image data. In various embodiments, the pixel information data may include at least one of data for autofocus, data for auto white balance, data for motion of an external object, and data for digital image stabilization (DIS).

In various embodiments, the operation of transmitting the pixel information data to the processor according to a transmission period specified by the processor or the control circuit may further include: an operation of identifying a sum of a size of compressed data for one image frame and a size of pixel information data for the one image frame, and a maximum capacity capable of being transmitted by the interface for one period; an operation of determining a transmission period corresponding to a first transmission method as a transmission period corresponding to the transmission of the pixel information data when the sum exceeds the maximum capacity; and an operation of determining a frame interleaving method of combining split data obtained by splitting the compressed data for the one image frame and the compressed data for the one image frame for one period for transmitting data by the interface as a method of combining the compressed data and the pixel information data when the sum is equal to or smaller than the maximum capacity.

In various embodiments, the method may further include: an operation of splitting the pixel information data for the one image frame into split data when the frame interleaving method is determined as the method of combining the compressed data and the pixel information data, wherein the number of pieces of split data substantially corresponds to a number obtained by dividing a speed for transmitting the raw image by the image sensor by a speed for processing the pixel information data.

In various embodiments, when the frame interleaving method is determined as the method of combining the compressed data and the pixel information data and there are a plurality of types of the pixel information data, the operation of transmitting the pixel information data to the processor according to a transmission period specified by the processor or the control circuit may further include an operation of combining split data obtained by splitting pixel information data corresponding to each of the plurality of types and compressed data for the one image frame for one period for which the interface transmits data.

In various embodiments, when the sum is equal to or smaller than the maximum capacity, the method may further include an operation of identifying an attribute of the pixel information data; and an operation of determining a line interleaving method of combining at least a part of the pixel information data for the one image frame with every specified data line spacing of the compressed data for the one image frame and transmitting the data for one period for transmitting the data by the interface as the method of combining the compressed data and the pixel information data when the attribute of the pixel information data corresponds to an attribute that requires fast processing in the processor.

In various embodiments, the method may further include an operation of determining the frame interleaving method as the method of combining the compressed data and the pixel information data when the attribute of the pixel information data does not correspond to an attribute set to cause fast processing being performed in the processor.

In addition, the structure of the data used in the above-described embodiments of the present disclosure may be recorded on a computer readable recording medium through various means. The computer readable recording medium may include a storage medium such as a magnetic storage medium (for example, a read only memory (ROM), a floppy disk, a hard disk, or the like) and an optical reading medium (for example, a compact disc-ROM (CD-ROM), digital versatile discs (DVDs), or the like).

In an embodiment, the computer-readable storage medium may store a program to execute, in the electronic device, operations of receiving a signal for photographing an external object, acquiring a plurality of pieces of raw image data for the external object using the image sensor, generating pixel information data associated with control of the photographing of the processor using at least some of the obtained plurality of pieces of acquired raw image data, generating compressed data obtained by compressing at least some of the plurality of pieces of raw image data, transmitting the pixel information data to the processor in accordance with a transmission period specified by the processor or the control circuit and transmitting the compressed data to the processor.

The present disclosure has been described with reference to various example embodiments thereof. It will be understood by a person skilled in the art that the present disclosure can be implemented in modified forms without departing from the essential characteristics of the present disclosure. Therefore, disclosed embodiments should be considered from a descriptive perspective, not from a limited perspective. The scope of the present disclosure is defined not by the detailed description but by the appended claims, and all differences within the scope should be understood as being included in the present disclosure.

The invention claimed is:

1. An electronic device comprising:
a processor; and
an image sensor module electrically connected to the processor,
wherein the image sensor module includes an image sensor and a control circuit electrically connected to the image sensor and connected to the processor via an interface, and
wherein the control circuit is configured to:
receive a signal for photographing an external object;
acquire a plurality of pieces of raw image data for the external object using the image sensor;
generate pixel information data associated with control of the photographing of the processor using at least some of the plurality of acquired pieces of raw image data;
generate compressed data obtained by compressing at least some of the plurality of pieces of raw image data;
transmit the pixel information data to the processor in accordance with a transmission period specified by the processor or the control circuit;
transmit the compressed data to the processor;
generate compressed pixel information data by compressing the pixel information data;
transmit the compressed pixel information data to the processor when a compression rate of the compressed pixel information data satisfies a specified compression rate; and
transmit uncompressed pixel information data to the processor when the compression rate does not satisfy the specified compression rate.

2. The electronic device of claim 1, wherein the control circuit is configured to:
transmit the pixel information data to the processor without compressing when the pixel information data has a size smaller than a specified size; and
compress the pixel information data when the pixel information data has a size equal to greater than the specified size.

3. The electronic device of claim 1, wherein the image sensor comprises a dual pixel image sensor including a pixel in which two or more photosensitive diodes are arranged, and
wherein the control circuit is configured to generate the pixel information data based on a phase difference caused by the arrangement identified in the at least some of the plurality of pieces of raw image data.

4. The electronic device of claim 1, wherein the pixel information data comprises at least one of data for phase autofocus, data for auto white balance, data for motion of an external object, and data for digital image stabilization (DIS).

5. The electronic device of claim 1, wherein the control circuit is configured to:
identify a sum of a size of compressed data for one image frame and a size of pixel information data for the one image frame, and a maximum capacity capable of being transmitted by the interface for one period; and
determine a frame interleaving method of combining split data obtained by splitting the compressed data for the one image frame and the compressed data for the one image frame for one period for transmitting data by the interface as a method of combining the compressed data and the pixel information data when the sum exceeds the maximum capacity.

6. The electronic device of claim 5, wherein the control circuit is configured to split the pixel information data for the one image frame into split data when the frame interleaving method is determined as the method of combining the compressed data and the pixel information data,
wherein a number of pieces of split data substantially corresponds to a number obtained by dividing a speed for transmitting the raw image by the image sensor by a speed for processing the pixel information data.

7. The electronic device of claim 5, wherein the control circuit is configured to:
determine the frame interleaving method as the method of combining the compressed data and the pixel information data; and
combine, when there are a plurality of types of pixel information data, split data obtained by splitting pixel information data corresponding to each of the plurality of types for the one image frame and the compressed data for the one image frame.

8. The electronic device of claim 5, wherein the control circuit is configured to:
identify an attribute of the pixel information data when the sum is equal to or smaller than the maximum capacity; and determine a line interleaving method of combining at least a part of the pixel information data for the one image frame with every specified data line spacing of the compressed data for the one image frame and transmitting the data for one period for transmitting the data by the interface as the method of combining the compressed data and the pixel information data when the attribute of the pixel information data corresponds to an attribute that requires fast processing in the processor.

9. The electronic device of claim 8, wherein the control circuit is configured to determine the frame interleaving method as the method of combining the compressed data and the pixel information data when the attribute of the pixel information data does not correspond to an attribute set to cause fast processing being performed in the processor.

10. A method for transmitting image data and data associated with control of image capture, the method comprising:
receiving a signal for photographing an external object by a control circuit included in a sensor module including an image sensor;
acquiring a plurality of pieces of raw image data for the external object using the image sensor by the control circuit;
generating pixel information data associated with the image capture of a processor electrically connected to the image sensor and connected to the control circuit via an interface, using at least some of the plurality of acquired pieces of raw image data by the control circuit;
generating compressed data obtained by compressing at least some of the plurality of pieces of raw image data;
transmitting the pixel information data to the processor according to a transmission period specified by the processor or the control circuit;
transmitting the compressed data to the processor;
generating compressed pixel information data by compressing the pixel information data,
wherein the transmitting of the pixel information data to the processor according to the specified transmission period comprises:
transmitting the compressed pixel information data to the processor when a compression rate of the compressed pixel information data satisfies a specified compression rate; and
transmitting uncompressed pixel information data to the processor when the compression rate does not satisfy the specified compression rate.

11. The method of claim 10, wherein the transmitting of the pixel information data to the processor according to the transmission period specified by the processor or the control circuit further comprises transmitting the pixel information data to the processor without compressing the pixel information data when a size of the pixel information data is smaller than a specified size, and
wherein the generating of the compressed pixel information data by compressing the pixel information data further comprises compressing the pixel information data when the size of the pixel information data is equal to or greater than the specified size.

12. The method of claim 10, wherein the image sensor comprises a dual pixel image sensor including a pixel in which two or more photosensitive diodes are arranged, and
wherein the image sensor is configured to generate the pixel information data based on a phase difference caused by the arrangement identified in the at least some of the plurality of pieces of raw image data.

13. The method of claim 10, wherein the transmitting of the pixel information data to the processor according to the transmission period specified by the processor or the control circuit further comprises:
identifying a sum of a size of compressed data for one image frame and a size of pixel information data for the one image frame, and a maximum capacity capable of being transmitted by the interface for one period; and
determining a frame interleaving method of combining split data obtained by splitting the compressed data for the one image frame and the compressed data for the one image frame for one period for transmitting data by the interface as a method of combining the compressed data and the pixel information data when the sum exceeds the maximum capacity.

14. The method of claim 13, further comprising:
splitting the pixel information data for the one image frame into split data when the frame interleaving method is determined as the method of combining the compressed data and the pixel information data, a number of pieces of split data substantially corresponding to a number obtained by dividing a speed for transmitting the raw image by the image sensor by a speed for processing the pixel information data.

15. The method of claim 13, wherein, when the frame interleaving method is determined as the method of combining the compressed data and the pixel information data and there are a plurality of types of the pixel information data, and
wherein the transmitting of the pixel information data to the processor according to a transmission period specified by the processor or the control circuit further comprises an operation of combining split data obtained by splitting pixel information data corresponding to each of the plurality of types and compressed data for the one image frame for one period for which the interface transmits data.

16. The method of claim 13, further comprising:
when the sum is equal to or smaller than the maximum capacity, identifying an attribute of the pixel information data; and
determining a line interleaving method of combining at least a part of the pixel information data for the one image frame with every specified data line spacing of the compressed data for the one image frame and transmitting the data for one period for transmitting the data by the interface as the method of combining the compressed data and the pixel information data when the attribute of the pixel information data corresponds to an attribute that requires fast processing in the processor.

17. The method of claim 16, further comprising:
determining the frame interleaving method as the method of combining the compressed data and the pixel information data when the attribute of the pixel information data does not correspond to an attribute set to cause fast processing being performed in the processor.

18. The method of claim 10, wherein the pixel information data includes at least one of data for autofocus, data for auto white balance, data for motion of an external object, and data for digital image stabilization (DIS).

* * * * *